US007765206B2

(12) United States Patent (10) Patent No.: US 7,765,206 B2
Hillis et al. (45) Date of Patent: Jul. 27, 2010

(54) META-WEB

(75) Inventors: W. Daniel Hillis, Toluca Lake, CA (US); Bran Ferren, Beverly Hills, CA (US)

(73) Assignee: Metaweb Technologies, Inc., Dupoint, DE (US)

( * ) Notice: Subject to any disclaimer, the term of this patent is extended or adjusted under 35 U.S.C. 154(b) by 603 days.

(21) Appl. No.: 10/737,618

(22) Filed: Dec. 15, 2003

(65) Prior Publication Data

US 2004/0210602 A1 Oct. 21, 2004

Related U.S. Application Data

(63) Continuation-in-part of application No. 10/474,155, filed on Oct. 1, 2003, now Pat. No. 7,502,770.

(60) Provisional application No. 60/433,050, filed on Dec. 13, 2002, provisional application No. 60/529,245, filed on Dec. 12, 2003.

(51) Int. Cl.
G06F 7/00 (2006.01)
G06F 17/30 (2006.01)

(52) U.S. Cl. .................. 707/723; 707/748; 707/752; 715/230

(58) Field of Classification Search .................. 707/3, 707/1, 104.1, 5, 2, 203; 705/1; 715/500, 715/1, 517, 811, 839; 709/227; 725/38
See application file for complete search history.

(56) References Cited

U.S. PATENT DOCUMENTS 2,895,005 A 7/1959 Kock et al.

(Continued)

FOREIGN PATENT DOCUMENTS

EP 0 182 590 2/2002

(Continued)

OTHER PUBLICATIONS

Nagao et al. (Nagao hereinafter) (NPL: "Semantic Annotation and Transcoding: Making Web Content More Accessible"; Katashi Nagao, Yoshinari Shirai, Kevin Squire; Apr.-Jun. 2001; IEEE Multimedia).*

(Continued)

*Primary Examiner*—John E Breene
*Assistant Examiner*—Giovanna Colan
(74) *Attorney, Agent, or Firm*—Michael A. Glenn; Glenn Patent Group

(57) ABSTRACT

In a preferred embodiment, the invention dynamically generates content and presentation to a user by modifying conventional content, e.g. rendering, restructuring, filtering, or supplementing such content, based on information, e.g. annotations, stored in a database. The invention, referred to as the Meta-Web, allows a user at a Web browser, which may be any standard Web browser supported by a standard computing platform, to posit a query which is routed to a Meta-Web server. The Meta-Web server returns search results to the Web browser and the user may then explore the results, for example by clicking on a URL in the search results. The results returned to the user are produced after the Meta-Web server forwards the query to a search engine. The search engine then returns the results to the Meta-Web server. Unique to the invention is the provision of a registry 14 which also receives search results and/or other information from the Meta-Web server, and that accumulates knowledge, meta-knowledge that was created at a time of entry of such knowledge, and meta-knowledge in the form of one or more annotations that accumulate over time, where the annotations include any of, but are not limited to, usefulness of said knowledge, additional user opinions, certifications of veracity of said knowledge, commentary by users, and connections between the knowledge and other units of knowledge. The Meta-Web server either combines both the search results and information from the registry, or operates upon the search results in accordance with information contained in the registry. The search results are augmented or modified by the registry under control of the Meta-Web server, which then builds a results page. The results pages is then forwarded to the user's Web browser.

20 Claims, 42 Drawing Sheets

U.S. PATENT DOCUMENTS

| | | | |
|---|---|---|---|
| 3,116,365 A | 12/1963 | Prescott | |
| 3,992,586 A | 11/1976 | Jaffe | |
| 4,688,443 A | 8/1987 | Fabre et al. | |
| 4,847,784 A | 7/1989 | Clancey | 364/513 |
| 4,853,873 A | 8/1989 | Tsuji et al. | 364/513 |
| 4,881,135 A | 11/1989 | Heilweil | |
| 4,992,940 A | 2/1991 | Dworkin | |
| 4,996,642 A | 2/1991 | Hey | |
| 5,073,934 A | 12/1991 | Matyas et al. | |
| 5,117,258 A | 5/1992 | Iwata | |
| 5,133,045 A | 7/1992 | Gaither et al. | 395/51 |
| 5,212,768 A | 5/1993 | Itsuki et al. | 395/54 |
| 5,404,295 A | 4/1995 | Katz et al. | |
| 5,404,305 A | 4/1995 | Stiles, Jr. | |
| 5,426,510 A | 6/1995 | Meredith | |
| 5,430,473 A | 7/1995 | Beecher, II et al. | |
| 5,500,671 A | 3/1996 | Anderson et al. | |
| 5,511,122 A | 4/1996 | Atkinson | |
| 5,597,312 A | 1/1997 | Bloom et al. | |
| 5,598,209 A | 1/1997 | Cortjens et al. | |
| 5,612,734 A | 3/1997 | Nelson et al. | |
| 5,678,999 A | 10/1997 | Cicare | |
| 5,701,400 A | 12/1997 | Amado | |
| H1728 H | 5/1998 | Kelso et al. | |
| 5,751,337 A | 5/1998 | Allen et al. | |
| 5,751,809 A | 5/1998 | Davis et al. | |
| 5,832,474 A * | 11/1998 | Lopresti et al. | 707/2 |
| 5,867,799 A * | 2/1999 | Lang et al. | 707/1 |
| 5,907,619 A | 5/1999 | Davis | |
| 5,940,513 A | 8/1999 | Aucsmith et al. | |
| 5,956,404 A | 9/1999 | Schneier et al. | |
| 5,960,411 A | 9/1999 | Hartman et al. | |
| 5,963,245 A | 10/1999 | McDonald | |
| 5,995,624 A | 11/1999 | Fielder et al. | |
| 6,003,021 A | 12/1999 | Zadik et al. | |
| 6,009,173 A | 12/1999 | Sumner | |
| 6,012,053 A * | 1/2000 | Pant et al. | 707/3 |
| 6,070,149 A | 5/2000 | Tavor et al. | |
| 6,076,091 A | 6/2000 | Fohn et al. | |
| 6,076,163 A | 6/2000 | Hoffstein et al. | |
| 6,098,065 A | 8/2000 | Skillen et al. | |
| 6,125,445 A | 9/2000 | Arditti et al. | |
| 6,131,162 A | 10/2000 | Yoshiura et al. | |
| 6,171,109 B1 | 1/2001 | Ohsuga | |
| 6,185,558 B1 | 2/2001 | Bowman et al. | |
| 6,202,060 B1 * | 3/2001 | Tran | 707/3 |
| 6,202,062 B1 * | 3/2001 | Cameron et al. | 707/3 |
| 6,226,742 B1 | 5/2001 | Jakubowski et al. | |
| 6,230,269 B1 | 5/2001 | Spies et al. | |
| 6,283,757 B1 | 9/2001 | Meghnot et al. | |
| 6,292,211 B1 | 9/2001 | Pena | |
| 6,311,194 B1 | 10/2001 | Sheth et al. | 707/505 |
| 6,341,960 B1 | 1/2002 | Frasson et al. | |
| 6,347,333 B2 | 2/2002 | Eisendrath et al. | |
| 6,374,237 B1 * | 4/2002 | Reese | 707/3 |
| 6,401,206 B1 | 6/2002 | Khan et al. | |
| 6,405,175 B1 | 6/2002 | Ng | |
| 6,438,691 B1 | 8/2002 | Mao | |
| 6,466,918 B1 | 10/2002 | Spiegel et al. | |
| 6,471,586 B1 | 10/2002 | Aiki et al. | |
| 6,477,520 B1 | 11/2002 | Malaviya et al. | |
| 6,499,105 B1 | 12/2002 | Yoshiura et al. | |
| 6,507,357 B2 | 1/2003 | Hillis et al. | |
| 6,535,880 B1 | 3/2003 | Musgrove et al. | |
| 6,601,075 B1 | 7/2003 | Huang et al. | |
| 6,633,981 B1 | 10/2003 | Davis | |
| 6,751,733 B1 | 1/2004 | Nakamura et al. | |
| 6,691,106 B1 * | 2/2004 | Sathyanarayan | 707/3 |
| 6,704,729 B1 | 3/2004 | Klein et al. | |
| 6,714,234 B1 | 3/2004 | Hillis et al. | |
| 6,732,090 B2 * | 5/2004 | Shanahan et al. | 707/3 |
| 6,772,157 B2 | 8/2004 | Barnett et al. | |
| 6,789,126 B1 | 9/2004 | Saulpaugh et al. | |
| 6,799,176 B1 * | 9/2004 | Page | 707/5 |
| 6,807,535 B2 | 10/2004 | Goodkovsky | |
| 6,827,578 B2 | 12/2004 | Krebs et al. | |
| 6,856,968 B2 | 2/2005 | Cooley et al. | |
| 6,884,074 B2 | 4/2005 | Theilmann et al. | |
| 6,975,833 B2 | 12/2005 | Theilmann et al. | |
| 6,980,974 B2 | 12/2005 | Kobayashi et al. | |
| 6,988,198 B1 | 1/2006 | Zuccherato et al. | |
| 7,000,118 B1 | 2/2006 | Murthy et al. | |
| 7,058,628 B1 * | 6/2006 | Page | 707/5 |
| 7,065,494 B1 | 6/2006 | Evans | |
| 7,080,064 B2 * | 7/2006 | Sundaresan | 707/3 |
| 7,100,051 B1 | 8/2006 | Kipnis et al. | |
| 7,107,218 B1 * | 9/2006 | Preston | 704/270 |
| 7,143,089 B2 | 11/2006 | Petras et al. | |
| 7,165,080 B2 * | 1/2007 | Kotcheff et al. | 707/203 |
| 7,181,438 B1 * | 2/2007 | Szabo | 707/2 |
| 7,263,529 B2 | 8/2007 | Cordery et al. | |
| 7,263,671 B2 * | 8/2007 | Hull et al. | 715/839 |
| 7,337,389 B1 * | 2/2008 | Woolf et al. | 715/230 |
| 2001/0034837 A1 | 10/2001 | Kauski et al. | |
| 2002/0013780 A1 | 1/2002 | Brown et al. | |
| 2002/0016840 A1 | 2/2002 | Herzog et al. | |
| 2002/0023011 A1 | 2/2002 | Hatayama | |
| 2002/0023093 A1 * | 2/2002 | Ziff et al. | 707/104.1 |
| 2002/0026583 A1 | 2/2002 | Harrison et al. | |
| 2002/0049692 A1 | 4/2002 | Venkatram | |
| 2002/0069079 A1 * | 6/2002 | Vega | 705/1 |
| 2002/0072410 A1 | 6/2002 | Tanaka et al. | |
| 2002/0073080 A1 | 6/2002 | Lipkin | |
| 2002/0091836 A1 * | 7/2002 | Moetteli | 709/227 |
| 2002/0095579 A1 | 7/2002 | Yoshiura et al. | |
| 2002/0126120 A1 | 9/2002 | Snowdon et al. | |
| 2002/0152279 A1 * | 10/2002 | Sollenberger et al. | 709/217 |
| 2002/0161603 A1 | 10/2002 | Gonzales | |
| 2003/0033298 A1 * | 2/2003 | Sundaresan | 707/5 |
| 2003/0093790 A1 * | 5/2003 | Logan et al. | 725/38 |
| 2003/0134675 A1 | 7/2003 | Oberberger | |
| 2003/0152893 A1 | 8/2003 | Edgar | |
| 2003/0187841 A1 | 10/2003 | Zhang et al. | |
| 2003/0188180 A1 | 10/2003 | Overney | |
| 2003/0195834 A1 | 10/2003 | Hillis et al. | |
| 2004/0001104 A1 * | 1/2004 | Sommerer et al. | 345/811 |
| 2004/0003351 A1 * | 1/2004 | Sommerer et al. | 715/517 |
| 2004/0059625 A1 * | 3/2004 | Schrader | 705/10 |
| 2004/0097852 A1 | 5/2004 | Boyd et al. | |
| 2004/0205448 A1 * | 10/2004 | Grefenstette et al. | 715/500 |
| 2004/0205514 A1 * | 10/2004 | Sommerer et al. | 715/501.1 |
| 2005/0060283 A1 | 3/2005 | Petras et al. | |
| 2005/0107912 A1 | 5/2005 | Martin et al. | |
| 2005/0119053 A1 | 6/2005 | Suzuki et al. | |
| 2005/0245316 A1 | 11/2005 | Tanaka et al. | |

FOREIGN PATENT DOCUMENTS

| | | |
|---|---|---|
| JP | 04322649 | 11/1992 |
| JP | 08084328 | 3/1996 |
| WO | WO 00/05666 | 2/2000 |
| WO | WO 00/75840 | 12/2000 |
| WO | WO 01/01313 | 1/2001 |

OTHER PUBLICATIONS

"Annotea: An Open RDF Infrastrcuture for Shared Web Annotations"; Jose Kahan, Marja-Riitta Koivunen; May 1-5, 2001, Hong Kong; ACM.*

Nelson, C. "Use of Metadata Registries for Searching Statistical Data", Scientific and Statistical Database Management, 2002 Proceedings. 14th International Conference on Jul. 24-26, 2002, pp. 232-235.

Anguish Scott, "Storing your application's preferences and Support files," Jan. 14, 1998, Stepwise Server, http://www.stepwise.com.Articles/Technical/ApplicationStorage.html.

Michael Margolis and David Resnick; Third Voice: Vox Populi Vox Dei?; Oct. 1999; First Monday, vol. 4, No. 10; pp. 1-5; downloaded from: worldwideweb.firstmonday.org/issues/issue4_10/margolis/index.html.

* cited by examiner

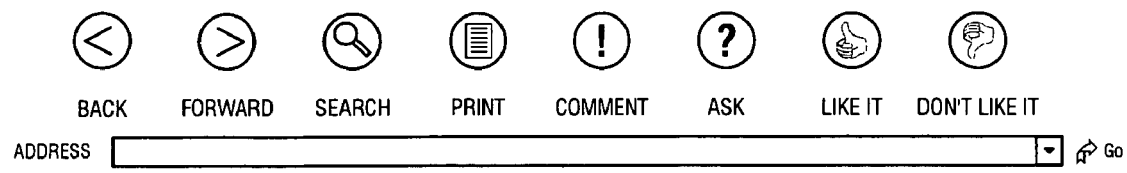

RESULTS  `FLAT SCREEN TV`

- Television Shopping Review/Video/TV & HDTV...
  ...Toshiba MV14FL4-14" Flat Screen TV/VCR Combo Avg. ... Toshiba MD20FL1 20" Flat Screen TV/DVD Combo Avg. ...
  shop.n.covs/exec/nbidoutg/browse/ · 28k · Cached ·Similar pages
  |More results from www.shopis.com

- Net TV vs. Sony Panasonic digital flat screen TV's pure plasma...
  ...Flat Screen TV's |Plasma TV |Digital Projectors |Wide Screen Digital Monitors |Plasma Digital Monitors |Resources
  Copyright © 2002 NeTV, Inc. ....
  shop.n.covs · 12k · Cached · Similar pages

- DTVCity: Plasma TV Monitors, Displays, and Flat Screen Tv for all...
  ...GSA Contracts PLASMA TV REVIEWS! Welcome to DTVCity.com-Your PLasma Tv Specialists, Panasonic Plasma TV, New Panasonic...
  Description: Offers plasma TV displays and flat panel TV's with accessories,
  www.dtvcity.com · 12k · Cached · Similar pages

- Flat Screen TV Direct - Connect to the Vision.
  ...Digital Vision Direct is a preferred dealer of Flat TV Plasma and LCD monitors. We provide some of the lowest pricing available
  Description: Retailer of plasma panels, LCD monitors and accessories. Includes mounting options.
  www.dtvcity.com/flatscreens · 12k · Cached · Similar pages

- Sony 27" & 32" Televisions.
  ...32" Televisions. Sony KV27FS200, Sony KV27FS200, Sony 27" Flat Screen TV $549.99. CircuitCity.com Find a store near you Sony 27" WEGA...
  www.eshop.com/marketplaceespn?mpld=5082&eatid=25 · 12k · Cached · Similar pages

- BBC News | SCI/TECH | Flat screen iMac wows design guru

*FIG. 3*

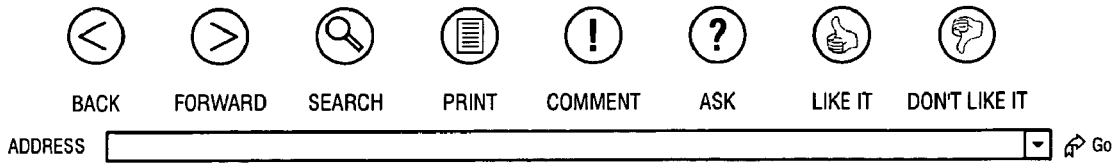

Shopping Guides 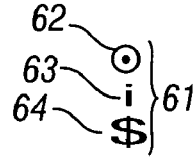 TV's

Televisions are available in an enormous range, from mini-TV's that fit in your pocket, to televisions that require four guys and a truck to move it the store to your house. The purpose of this guide is to assist you in choosing which TV is right for your home.

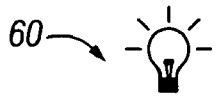

The Basics

- Plan your space - The first choice you need to make is where you're going to put your new television. Make sure that the location you choose works with the connections you require (like cable, stereo and power, for example). Consider the size of the room, if most viewers will be far from the screen, consider allowing room for projection TV. In general, though, standard direct-view TV's are adequate for most size rooms.
- Think about peripherals - Give some thought to what you will be connecting to your TV. This affects the TV you will choose, to some extent, but it also affects where you put the TV and what type of housing or stand you use. For example, if you have a DVD player, video game(s), stereo or other devices to connect to the TV, consider buying an entertainment center; this will allow you to channel all of the wires together.
- Pick a type and a size - If you choose a direct-view TV, you have four choices:

Dark line screens, now included in virtually all televisions 13" or larger, improve contrast and make images look brighter.

Be careful comparing sizes of TV's, particularly HDTV and flat panel. Although all screens are measured diagonally, flat panel and HDTV screens are much wider than they are tall.

- Standard - The one you know best, this model has a glass picture tube and (usually) a slight convex curve to the screen. These are available in sizes up to 36" (measured diagonally).

- SDTV (Standard Definition TV) - The next step up, these TV's are available in both analog and digital versions. They typically are available in sizes up to 36".

- HDTV (High Definition TV) - Slightly ahead of their time, HDTV's offer the sharpest images on the market. However they work best in large screen sizes, and thus may not work well in a small room. Note that HDTV reception is digital only; this may require an antenna or, if you use a satellite receiver, you may have to replace the dish. Most HDTV's can be switched to SDTV made for standard broadcasts. HDTV's range in size from 27" to 60".

- Flat Panel - These extraordinary (and extremely expensive) TV's use plasma technology to produce a crystal clear image on a completely flat screen. Since they don't use a picture tube, flat panel TV's are often only a few inches deep, allowing them to be hung on a wall. They range in size from 20" to 50".

- Projection TV's are available in two types, SDTV and HDTV, and range in size from 40" to 60".

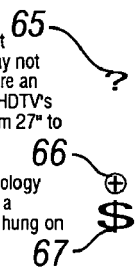

*FIG. 6*

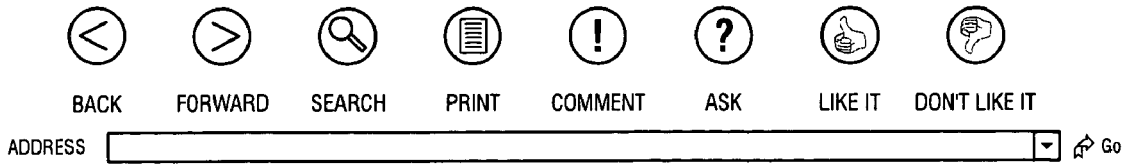

| BACK | FORWARD | SEARCH | PRINT | COMMENT | ASK | LIKE IT | DON'T LIKE IT |

ADDRESS [                                                                    ] Go

Shopping Guides  TV's

⊙

$

Televisions are available in an enormous range, from mini-TV's that fit in your pocket, to televisions that require four guys and a truck to move it the store to your house. The purpose of this guide is to assist you in choosing which TV is right for your home.

The Basics

- Plan your space - The first choice you need to make is where you're going to put your new television. Make sure that the location you choose works with the connections you require (like cable, stereo and power, for example). Consider the from the screen, consider allowing room for projecti direct-view TV's are adequate for most size rooms.
- Think about peripherals - Give some thought to what affects the TV you will choose, to some extent, but it type of housing or stand you use. For example, if you or other devices to connect to the TV, consider buyin you to channel all of the wires together.
- Pick a type and a size - If you choose a direct-view Dark line screens, now included in virtually all televisions 13" or larger, improve contrast and make images look brighter.

Be careful comparing sizes of TV's, particularly HDTV and flat panel. Although all screens are measured diagonally, flat panel and HDTV screens are much wider than they are tall.

— 70

FREQUENTLY ASKED QUESTIONS 

1. What is HDTV?
2. What are the HDTV standards?
3. Which stations broadcast in HDTV?
4. Can I view NTSC programs on an HDTV receiver?

- Standard - The one you know best, this model h slight convex curve to the screen. These are ava

- SDTV (Standard Definition TV) - The next step u analog and digital versions. They typically are av

- HDTV (High Definition TV) - Slightly ahead of their time, HDTV's offer the sharpest images on the market. However they work best in large screen sizes, and thus may not work well in a small room. Note that HDTV reception is digital only; this may require an antenna or, if you use a satellite receiver, you may have to replace the dish. Most HDTV's can be switched to SDTV made for standard broadcasts. HDTV's range in size from 27" to 60".

— 65

71

- Flat Panel - These extraordinary (and extremely expensive) TV's use plasma technology to produce a crystal clear image on a completely flat screen. Since they don't use a picture tube, flat panel TV's are often only a few inches deep, allowing them to be hung on a wall. They range in size from 20" to 50".

⊕
$

- Projection TV's are available in two types, SDTV and HDTV, and range in size from 40" to 60".

*FIG. 7*

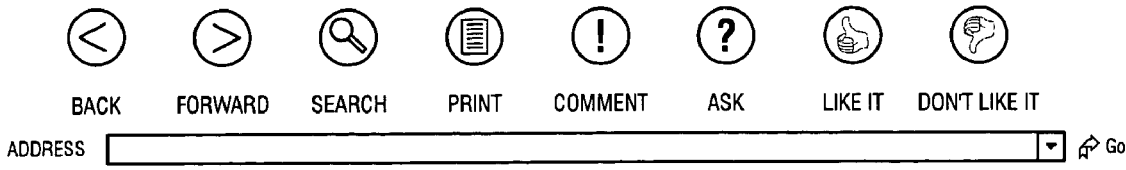

| BACK | FORWARD | SEARCH | PRINT | COMMENT | ASK | LIKE IT | DON'T LIKE IT |

ADDRESS [                                                                    ] Go

Shopping Guides — TV's

Televisions are available in an enormous range, from mini-TV's that fit in your pocket, to televisions that require four guys and a truck to move it the store to your house. The purpose of this guide is to assist you in choosing which TV is right for your home.

The Basics

Dark line screens, now included in virtually all televisions 13" or larger, improve contrast and make images look brighter.

- Plan your space · The first choice you need to make is where you're going to put your new television. Make sure that the location you choose works with the connections you require (like cable, stereo and power, for example). Consider the size of the room, if most viewers will be far from the screen, consider allowing room for projection TV. In general, though, standard direct-view TV's are adequate for most size rooms.
- Think about peripherals - Give some thought to what you will be connecting to your TV. This affects the TV you will choose, to some extent, but it also affects where you put the TV and what type of housing or stand you use. For example, if you have a DVD player, video game(s), stereo or other devices to connect to the TV, consider buying an entertainment center; this will allow you to channel all of the wires together.
- Pick a type and a size - If you choose a direct-view T

Be careful comparing sizes of TV's, particularly HDTV and flat panel. Although all screens are measured diagonally, flat panel and HDTV screens are much wider than they are tall.

- Standard - The one you know best, this model h slight convex curve to the screen. These are ava

- SDTV (Standard Definition TV) - The next step up analog and digital versions. They typically are av

- HDTV (High Definition TV) - Slightly ahead of the images on the market. However they work best i work well in a small room. Note that HDTV recep antenna or, if you use a satellite receiver, you ma can be switched to SDTV made for standard bro 60".

RELATED ITEMS & INFO

1. Buyer's Guide to Flat Screen TV's
2. epinions TV Reviews
3. Financing Home Electronics
4. Plasma TV Reviews
5. Crazy Gideon TV Special

— 81

— 66

- Flat Panel - These extraordinary (and extremely expensive) TV's use plasma technology to produce a crystal clear image on a completely flat screen. Since they don't use a picture tube, flat panel TV's are often only a few inches deep, allowing them to be hung on a wall. They range in size from 20" to 50".

80

- Projection TV's are available in two types, SDTV and HDTV, and range in size from 40" to 60".

*FIG. 8*

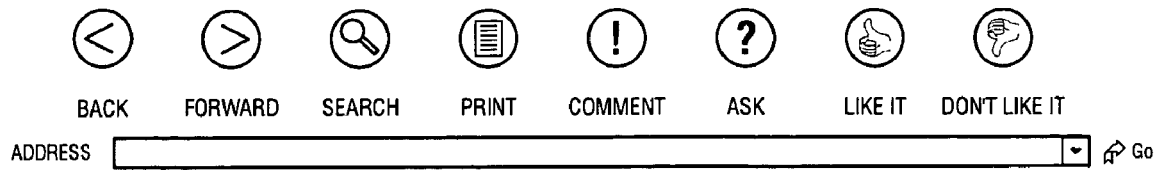

Shopping Guides  TV's

Televisions are available in an enormous range, from mini-TV's that fit in your pocket, to televisions that require four guys and a truck to move it the store to your house. The purpose of this guide is to assist you in choosing which TV is right for your home.

The Basics

Dark line screens, now included in virtually all televisions 13" or larger, improve contrast and make images look brighter.

Be careful comparing sizes of TV's, particularly HDTV and flat panel. Although all screens are measured diagonally, flat panel and HDTV screens are much wider than they are tall.

- Plan your space - The first choice you need to make is where you're going to put your new television. Make sure that the location you choose works with the connections you require (like cable, stereo and power, for example). Consider the size of the room, if most viewers will be far from the screen, consider allowing room for projection TV. In general, though, standard direct-view TV's are adequate for most size rooms.
- Think about peripherals - Give some thought to what you will be connecting to your TV. This affects the TV you will choose, to some extent, but it also affects where you put the TV and what type of housing or stand you use. For example, if you have a DVD player, video game(s), stereo or other devices to connect to the TV, consider buying an entertainment center; this will allow you to channel all of the wires together.
- Pick a type and a size - If you choose a direct-view

- Standard - The one you know best, this model h slight convex curve to the screen. These are ava

- SDTV (Standard Definition TV) - The next step u analog and digital versions. They typically are av

- HDTV (High Definition TV) - Slightly ahead of the images on the market. However they work best i work well in a small room. Note that HDTV recep antenna or, if you use a satellite receiver, you ma can be switched to SDTV made for standard bro 60".

/—81

RELATED ITEMS & INFO 

1. Buyer's Guide to Flat Screen TV's
2. epinions TV Reviews
3. Financing Home Electronics
4. Plasma TV Reviews
5. Crazy Gideon TV Special

—91

- Flat Panel - These extraordinary (and extremely expensive) TV's use plasma technology to produce a crystal clear image on a completely flat screen. Since they don't use a picture tube, flat panel TV's are often only a few inches deep, allowing them to be hung on a wall. They range in size from 20" to 50".

- Projection TV's are available in two types, SDTV and HDTV, and range in size from 40" to 60".

190  RESULTS  [LASIK]  

○ ...Lasik Eye Surgery - American Journal of Opthamology
...The American Journal of Opthamology is widely recognized as one of the leading ...
www.amerjournalopthamology.com/doctor.lasik.html · 14k · Cached ·Similar pages ○ ...Lasik Eye Surgery: Learning About LASIK
...to follow, and questions to ask your doctor before undergoing LASIK surgery... of the
cornea, the clear covering of the front the eye, using an eximer laser...
www.ida.gov/friac/feaatures/cdhr/lasik - 12k · Sept., 2002 · Cached · Similar pages ○ ...Lasik Eye Surgery: Is it Worth Looking Into?
...Laser Eye Surgery: Is it Worth Looking Into? by Carol Lewis for Jeri Goldstein
everything was a blur... Are You a Candidate for Laser Eye Surgery?...
www.lasikinformer.com/questions · 45k · 13 August 2002 · Cached · Similar pages ○ American Academy of Opthamology, LASIK Eye Surgery
...In addition to serving as an Academy guideline for LASIK procedures...
206.1434.20/asp/newsroom/spokesperson/rmaloney.cfm · 28k · Cached · Similar pages ○ ...LASIK Eye Surgery and Lamellar Kerotoplasy, Robert Mudd, M.D..
...Lamellar Kerotoplasy for Hyperopia by Dr. Mudd is a comprehensive examination...
www.mudd.com/LKHasp?pages1_129htm · 36k · Cached · Similar pages ○ ...LASIK Eye Surgery Education Council
...The ESEC... make informed decisions about undergoing laser eye surgery...
www.techtv.com/news/scitech/story/ D.24184943.00.html · 38k · Cached · Similar pages ...Fifty Tips on LASIK Techniques, Video Journal of Opthamology, June 2000
... based on 28,000 procedures... provides fifty tips on LASIK technique, complications, and practice...

*FIG. 20*

190 RESULTS [LASIK]

200 ⊙ ...Lasik Eye Surgery - American Journal of Opthamology
...The American Journal of Opthamology is widely recognized as one of the leading ...
www.amerjournalopthamology.com/doctor.lasik.html · 14k · Cached ·Similar pages ⊙ ...Lasik Eye Surgery; Learning About LASIK
...to follow, and questions to ask your doctor before undergoing LASIK surgery... of the
cornea, the clear covering of the front the eye, using an eximer laser...
www.ida.gov/friac/feaatures/cdhr/lasik - 12k · Sept., 2002 · Cached · Similar pages ⊙ ...Lasik Eye Surgery; Is it Worth Looking Into?
...Laser Eye Surgery: Is it Worth Looking Into? by Carol Lewis for Jeri Goldstein
everything was a blur... Are You a Candidate for Laser Eye Surgery?...
www.lasikinformer.com/questions · 45k · 13 August 2002 · Cached · Similar pages ⊙ American Academy of Opthamology, LASIK Eye Surgery
...In addition to serving as an Academy guideline for LASIK procedures...
206.1434.20/asp/newsroom/spokesperson/rmaloney.cfm · 28k · Cached · Similar pages ⊙ ...LASIK Eye Surgery and Lamellar Kerotoplasy, Robert Mudd, M.D.,
...Lamellar Kerotoplasy for Hyperopia by Dr. Mudd is a comprehensive examination...
www.mudd.com/LKHasp?pages1_129htm · 36k · Cached · Similar pages ⊙ ...LASIK Eye Surgery Education Council
...The ESEC... make informed decisions about undergoing laser eye surgery...
www.techtv.com/news/scitech/story/ D.24184943.00.html · 38k · Cached · Similar pages

...Fifty Tips on LASIK Techniques, Video Journal of Opthamology, June 2000
... based on 28,000 procedures... provides fifty tips on LASIK technique, complications, and practice...

*FIG. 21*

BACK    FORWARD    SEARCH    PRINT    COMMENT    ASK    LIKE IT    DON'T LIKE IT

ADDRESS

210 →

 Journal of Refractive Surgery
Volume 12 (4) May / June 1996

*the official publication of the International Society of Refractive Surgery, published by SLACK incorporated*

- ABSTRACT
- CASE REPORTS
- DISCUSSION
- REFERENCES

Brief Report

Autologous Kerotophakia for the Correction of Consecutive Hyperopia After Automated Lamellar Keratoplasty for Myopia

*William Strong MD FRCDphd;*
*Robert K. Maiway, MD, MA (Oral)*

ABSTRACT

PURPOSE

Consecutive hyperopia secure if too much corneal tissue is reacted during automated lamellar keratoplasty for myopia. We report what are, to our knowledge, the first two cases of consecutive hyperopia after automated lamellar keratoplasty that were treated by keratophakia with autologous corneal tissue.

METHOD

The patient in case 1 had a spherical equivalent refraction of +3.38 diopers (D) and the patient in case 2 a refraction of +2.62 D in each eye after automated lamellar keratoplasty for myopia. Corneal tissue from the contralamed eye of each patient was obtained with an automated misrokeratoms and

*FIG. 22*

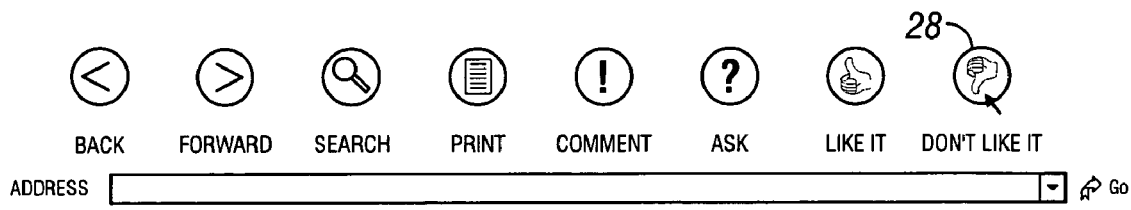

210 ⟶ Journal of Refractive Surgery
Volume 12 (4) May / June 1996

*the official publication of the International Society of Refractive Surgery, published by SLACK incorporated*

☐ ABSTRACT
☐ CASE REPORTS
☐ DISCUSSION
☐ REFERENCES

Brief Report

Autologous Kerotophakia for the Correction of Consecutive Hyperopia After Automated Lamellar Keratoplasty for Myopia

*William Strong MD FRCDphd;*
*Robert K. Malway, MD, MA (Oral)*

ABSTRACT

PURPOSE

Consecutive hyperopia secure if too much corneal tissue is reacted during automated lamellar keratoplasty for myopia. We report what are, to our knowledge, the first two cases of consecutive hyperopia after automated lamellar keratoplasty that were treated by keratophakia with autologous corneal tissue.

METHOD

The patient in case 1 had a spherical equivalent refraction of +3.38 diopers (D) and the patient in case 2 a refraction of +2.62 D in each eye after automated lamellar keratoplasty for myopia. Corneal tissue from the contralamed eye of each patient was obtained with an automated misrokeratoms and

*FIG. 23*

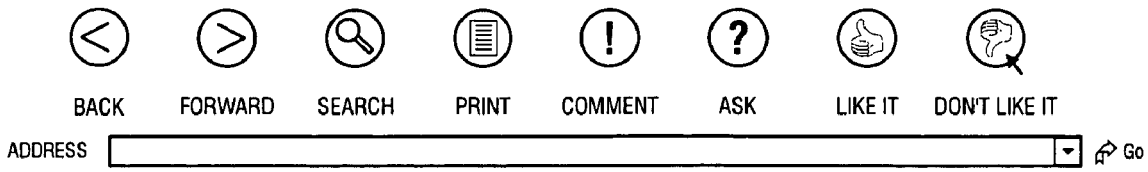

RESULTS

198

LASIK

⊙ ...Old Tech Offers Alternative to Lasers, TechTV.
...shape, Among the doctors who use it is Dr. Maloney, director of the Maloney-Seibel Vision Institute in California ...
www.techtv.com/news/csitech/story/ 0.24195.3384943.00html · 14k · Cached ·Similar pages ⊙ ...LASIK Eye Surgery for Dummies, Dr. Brian Brain
...the FDA clinical trials of these permanent lenses which are implanted behind the cornea...
www.extratv.com/dailynews/extra/02.01/89a.6html- 30k · Cached · Similar pages ⊙ ...National Institute of Health : | Lasik Eye Surgery
...Dr. Robert K. Maloney of the Maloney Vision Institute offers the following guidelines to quality care and treatment...
www.extratv.com/dailynews/extra/02.01/89a.6html · 31k · Cached · Similar pages ⊙ American Vision Institute, Will, Drill, MD, MA (Oxon)
...Dr. Will Drill, the director of the American Vision Institute is widely recognized as one of the leading...
www.americanvision.com/doctor.piographics.html · 14k · Cached · Similar pages ⊙ ...American Academy of Opthamology, LASIK.
...in addition to serving as an Academy spokesperson, Dr. Maloney has received the Academy's Honor Award...
206.1484.20/aao/newsroom/spokesperson/rmaloney.cfm · 26k · Cached · Similar pages ⊙ ...Laser Eye Surgery, Dr. Spot, MD.
...Lamellar Keratoplasty for hyperopia by Dr. Maloney is a comprehensive examination of the procedures...
www.maloneyvision.com/LXH.asp/page 1_129htm · 38k · Cached · Similar pages ⊙ ...Fifty Tips on LASIK Techniques, Part II, Video Journal of Opthamology, June 2000
... fifty tips on LASIK technique, complications, and practice called from 23.9998 procedures...
www.inedvideo.com/vio/2000/june2000.seg1.html · 13k · Cached · Similar Pages

*FIG. 24*

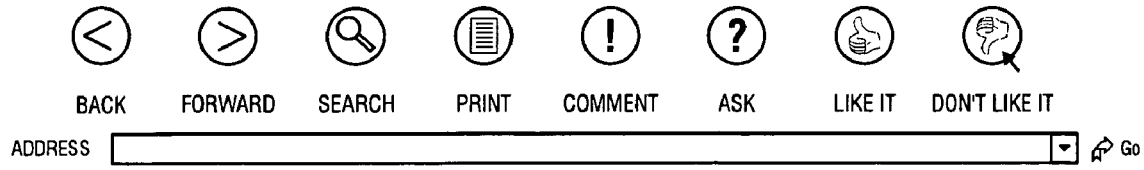

RESULTS  [LASIK]

198

230

◉ ...Old Tech Offers Alternative to Lasers, TechTV.
...shape, Among the doctors who use it is Dr. Maloney, director of the Maloney-Seibel Vision Institute in California ...
www.techtv.com/news/csitech/story/ 0.24195.3384943.00html · 14k · Cached ·Similar pages ◉ ...LASIK Eye Surgery for Dummies, Dr. Brian Brain
...the FDA clinical trials of these permanent lenses which are implanted behind the cornea...
www.extratv.com/dailynews/extra/02.01/89a.6html- 30k · Cached · Similar pages ◉ ...National Institute of Health ; | Lasik Eye Surgery
...Dr. Robert K. Maloney of the Maloney Vision Institute offers the following guidelines to quality care and treatment...
www.extratv.com/dailynews/extra/02.01/89a.6html · 31k · Cached · Similar pages ◉ American Vision Institute, Will, Drill, MD, MA (Oxon)
...Dr. Will Drill, the director of the American Vision Institute is widely recognized as one of the leading...
www.americanvision.com/doctor.piographics.html · 14k · Cached · Similar pages ◉ ...American Academy of Opthamology, LASIK,
...in addition to serving as an Academy spokesperson, Dr. Maloney has received the Academy's Honor Award...
206.1484.20/aao/newsroom/spokesperson/rmaloney.cfm · 26k · Cached · Similar pages ◉ ...Laser Eye Surgery, Dr. Spot, MD,
...Lamellar Keratoplasty for hyperopia by Dr. Maloney is a comprehensive examination of the procedures...
www.maloneyvision.com/LXH.asp/page 1_129htm · 38k · Cached · Similar pages ◉ ...Fifty Tips on LASIK Techniques, Part II, Video Journal of Opthamology, June 2000
... fifty tips on LASIK technique, complications, and practice called from 23.9998 procedures...
www.inedvideo.com/vio/2000/june2000.seg1.html · 13k · Cached · Similar Pages

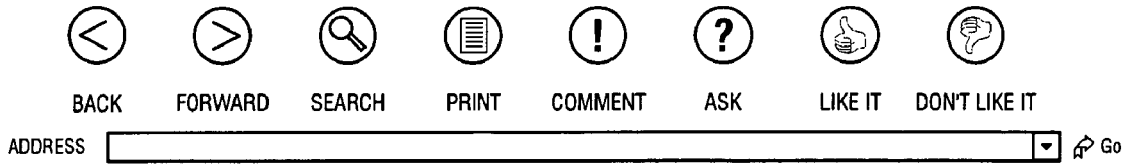

370 VENDORS [LASIK] 

- Dr. Seymour D. Taylie-LASIK laser vision correction, Medicare, Medi-cal, Medistake and most other vision plans accepted. VISA Mastercard and AMEX accepted..
  1254a Elm St., Glendate 818 340-5555 (4 miles from home) http:/www.TayBe.com

- Star Vision- Where do stars like BOB HOPE , MERYL STREEP, and LISA BOLSTEAD, go to get their vision fixed? We are not sure, but we would like them to come to us. Conveniently located in the heart of East Hollywood's adult entertainment district.
  3254 Sunset Ave. Hollywood 310 383-5555 (4 miles from work)

- Maloney Vision Institute - Dr. Robert Maloney, M.D. Comprehensive eye care. Insurance accepted.
  12543 Wilshire Blvd., Westwood (818) 323-5555 (14 miles from work) http://www.malonyvision.com

- Dr. I. C. Keady- Laser vision correction. Medicare, Medi-cal, and most other vision plans accepted.
  1254 Oak St., Glendale 818 320-5555 (6 miles from home)

- Blink of an Eye- Walk-in laser vision surgery. WHILE YOU WAIT. All equipment on premises. Insurance plans. Our customers come back again and again.
  2423 Western Ave., Compton (310) 654-7768 (8 miles from home)

- VeyeP- Valley Eye Professionals, LASIK laser vision correction, state of the art eye exams, children's vision care, state of the art procedures for cateracts and gloucoma. 81C eye charts.
  12543 Victory Ave., Westwood (818) 323-5555 (26 miles from home) http:/www.VeyeP.com

- Eye2Eye- Laser vision surgery. We care about vision care. All equipment new and clean. Insurance plans. Our customers never come back.
  4830 Dirkard Drive, Burbank (310) 412-1423 (18 miles from home)

*FIG. 39*

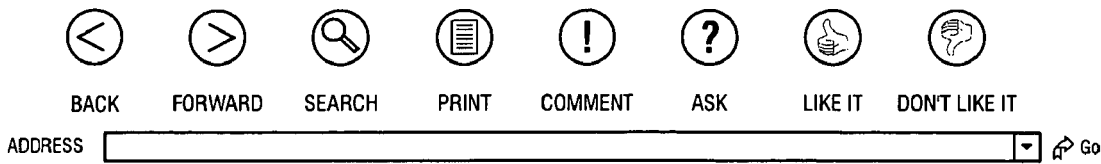

BACK  FORWARD  SEARCH  PRINT  COMMENT  ASK  LIKE IT  DON'T LIKE IT

ADDRESS [                                                    ] ▼ ⇗ Go

370 VENDORS [LASIK            ] 

⊙ Dr. Seymour D. Taylie-LASIK laser vision correction, Medicare, Medi-cal, Medistake and most other vision plans accepted. VISA Mastercard and AMEX accepted..
1254a Elm St., Glendale 818 340-5555 (4 miles from home) http:/www.TayBe.com ⊙ Star Vision- Where do stars like BOB HOPE , MERYL STREEP and LISA BOLSTEAD, go to get their vision fixed? We are not sure, but we would like them to come to us. Conveniently located in the heart of East Hollywood's adult entertainment district.
3254 Sunset Ave. Hollywood 310 383-5555 (4 miles from work)

380 ⊙ Maloney Vision Institute - Dr Robert Maloney, M.D. Comprehensive eye care. Insurance accepted.
http://www.malonyvision.com

RELEVANCY

[                                              ] ther vision plans accepted.

This vendor was recommended because:

381 ☐ Peer Group Rating: 7,6 of 10
☐ Close to home (2.6 miles)         pment on premises. Insurance plans. Our customers
☐ Close to work (8.3 miles)
☐ Dr. Maloney rating: 9.2/10 by Dr. Szabo
☐ Dr. Szabo rating, 9.6/10 by you   the art eye exams, children's vision care, state of the art
☐ Member of the Better Business Bureau
☐ Covered by HealthFirst medical plan  http:/www.VeyePcom t new and clean. Insurance plans. Our customers never come
back.
4830 Dirkard Drive, Burbank (310) 412-1423 (18 miles from home)

☐ Expand this search to a wider area-

FIG. 40

BACK  FORWARD  SEARCH  PRINT  COMMENT  ASK  LIKE IT  DON'T LIKE IT

ADDRESS [                                                    ] ▼ ⌀ Go

370 VENDORS  [LASIK            ]   

- Dr. Seymour D. Taylie-LASIK laser vision correction, Medicare, Medi-cal, Medistake and most other vision plans accepted. VISA Mastercard and AMEX accepted..
  1254a Elm St., Glendale 818 340-5555 (4 miles from home) http:/www.TayBe.com

- Star Vision- Where do stars like BOB HOPE , MERYL STREEP, and LISA BOLSTEAD, go to get their vision fixed? We are not sure, but we would like them to come to us. Conveniently located in the heart of East Hollywood's adult entertainment district.
  3254 Sunset Ave. Hollywood 310 383-5555 (4 miles from work)

- Maloney Vision Institute - Dr. Robert Maloney, M.D. Comprehensive eye care. Insurance accepted.  —390
  12543 Wilshire Blvd., Westwood (818) 323-5555 (14 miles from work) http://www.malonyvision.com

- Dr. I. C. Keady- Laser vision correction. Medicare, Medi-cal, and most other vision plans accepted.
  1254 Oak St., Glendale 818 320-5555 (6 miles from home)

- Blink of an Eye- Walk-in laser vision surgery. WHILE YOU WAIT. All equipment on premises. Insurance plans. Our customers come back again and again.
  2423 Western Ave., Compton (310) 654-7768 (8 miles from home)

- VeyeP- Valley Eye Professionals, LASIK laser vision correction, state of the art eye exams, children's vision care, state of the art procedures for cateracts and gloucoma. 81C eye charts.
  12543 Victory Ave., Westwood (818) 323-5555 (26 miles from home) http:/www.VeyeP.com

- Eye2Eye- Laser vision surgery. We care about vision care. All equipment new and clean. Insurance plans. Our customers never come back.
  4830 Dirkard Drive, Burbank (310) 412-1423 (18 miles from home)

☐Expand this search to a wider area-

FIG. 41

META-WEB

CROSS-REFERENCE TO RELATED APPLICATIONS

This application is a continuation-in-part of U.S. patent application Ser. No. 10/474,155, filed 1 Apr. 2002 now U.S. Pat. No. 7,502,770 entitled "Knowledge Web", and claims priority to U.S. Provisional Patent Application Ser. No. 60/433,050, filed 13 Dec. 2002 entitled "Automated Purchasing System/Multi-Player Game Hub With Voting Scheme", and U.S. Provisional Patent Application Ser. No. 60/529,245, filed 12 Dec. 2003, entitled "Reputation System", all of which are incorporated herein in their entirety by this reference thereto.

BACKGROUND OF THE INVENTION

1. Technical Field

The invention relates to knowledge. More particularly, the invention relates to a system for organizing knowledge in such a way that users can find it, learn from it, and add to it as needed.

2. Description of the Prior Art

There is widespread agreement that the amount of knowledge in the world is growing so fast that even experts have trouble keeping up. Today not even the most highly trained professionals—in areas as diverse as science, medicine, law, and engineering—can hope to have more than a general overview of what is known. They spend a large percentage of their time keeping up on the latest information, and often specialize in highly narrow sub-fields because they find it impossible to keep track of broader developments.

Education traditionally meant the acquisition of the knowledge people needed for their working lives. Today, however, a college education can only provide an overview of knowledge in a specialized area, and a set of skills for learning new things as the need arises. Professionals need new tools that allow them to access new knowledge as they need it.

The World Wide Web

In spite of this explosion of knowledge, mechanisms for distributing it have remained pretty much the same for centuries: personal communication, schools, journals, and books. The World Wide Web is the one major new element in the landscape. It has fundamentally changed how knowledge is shared, and has given us a hint of what is possible. Its most important attribute is that it is accessible it has made it possible for people to not only learn from materials that have now been made available to them, but also to easily contribute to the knowledge of the world in their turn. As a result, the Web's chief feature now is people exuberantly sharing their knowledge.

The Web also affords a new form of communication. Those who grew up with hypertext, or have otherwise become accustomed to it, find the linear arrangement of textbooks and articles confining and inconvenient. In this respect, the Web is clearly better than conventional text.

The Web, however, is lacking in many respects.

It has no mechanism for the vetting of knowledge. There is a lot of information on the Web, but very little guidance as to what is useful or even correct.

There are no good mechanisms for organizing the knowledge in a manner that helps users find the right information for them at any time. Access to the (often inconsistent or incorrect) knowledge on the Web thus is often through search engines, which are all fundamentally based on key word or vocabulary techniques. The documents found by a search engine are likely to be irrelevant, redundant, and often just plain wrong.

The Web knows very little about the user (except maybe a credit card number). It has no model of how the user learns, or what he does and does not know—or, for that matter, what it does and does not know.

A Comparison of Knowledge Sources

There are several aspects to how learners obtain knowledge—they might look at how authoritative the source is, for example, or how recent the information is, or they might want the ability to ask the author a question or to post a comment. Those with knowledge to share might prefer a simple way to publish that knowledge, or they might seek out a well-known publisher to maintain their authority.

While books and journals offer the authority that comes with editors and reviewers, as well as the permanence of a durable product, the Web and newsgroups provide immediacy and currency, as well as the ability to publish without the bother of an editorial process. Table "A" is a summary of the affordances of various forms of publishing.

TABL A

Affordances of Various Forms of Publishing

| | The Web | News Groups | Text Books | Journals |
|---|---|---|---|---|
| Peer-to-Peer publishing | Yes | Yes | No | Limited |
| Supports linking | Yes | Limited | No | Limited |
| Ability to add annotations | No | Yes | No | No |
| Vetting and certification | No | Limited | Yes | Yes |
| Supports payment model | Limited | No | Yes | Yes |
| Supports guided learning | Limited | No | Yes | No |

Corporate and Government Needs

For institutions, corporations, and governments, failure to keep track of knowledge has consequences that are quite different from those for an individual. Often, institutions make a bad decision due to lack of knowledge on the part of those at the right place and at the right time, even though someone else within the institution may actually hold the relevant knowledge.

Similarly, within a corporation, the process of filtering and abstracting knowledge as it moves through the hierarchy often leaves the decision-maker (whether the CEO, the design engineer, or the corporate lawyer) in a position of deciding without the benefit of the best information. The institutional problem is made worse by the problem of higher employee turnover in the more fluid job market, so that the traditional depository of knowledge—long-standing employees—is beginning to evaporate, just as the amount of knowledge that needs to be kept track of is exploding.

The consequences of not having the right knowledge at the right place and time can be very severe: doctors prescribing treatments that are sub-optimal, engineers designing products without the benefit of the latest technical ideas, business executives making incorrect strategic decisions, lawyers making decisions without knowledge of relevant precedents or laws, and scientists working diligently to rediscover things that are already known—all these carry tremendous costs to society.

The invention addresses the problem of providing a system that has a very large, e.g. multi-petabyte, database of knowledge to a very large number of diverse users, which include both human beings and automated processes. There are many aspects of this problem that are significant challenges. Managing a very large database is one of them. Connecting related data objects is another. Providing a mechanism for creating and retrieving metadata about a data object is a third.

In the past, various approaches have been used to solve different parts of this problem. The World Wide Web, for example, is an attempt to provide a very large database to a very large number of users. However, it fails to provide reliability or data security, and provides only a limited amount of metadata, and only in some cases. Large relational database systems tackle the problem of reliability and security very well, but are lacking in the ability to support diverse data and diverse users, as well as in metadata support.

The ideal system should permit the diverse databases that exist today to continue to function, while supporting the development of new data. It should permit a large, diverse set of users to access this data, and to annotate it and otherwise add to it through various types of metadata. Users should be able to obtain a view of the data that is complete, comprehensive, valid, and enhanced based on the metadata.

The system should support data integrity, redundancy, availability, scalability, ease of use, personalization, feedback, controlled access, and multiple data formats. The system must accommodate diverse data and diverse metadata, in addition to diverse user types. The access control system must be sufficiently flexible to give different users access to different portions of the database, with distributed management of the access control. Flexible administration must allow portions of the database to be maintained independently, and must allow for new features to be added to the system as it grows.

It would be advantageous to provide a system to organize knowledge in such a way that users can find it, learn from it, and add to it as needed.

SUMMARY OF THE INVENTION

In a preferred embodiment, the invention dynamically generates content and presentations for a user by modifying conventional content, e.g. rendering, restructuring, filtering, or supplementing such content, based on information, e.g. annotations, stored in a database. The invention, referred to as the Meta-Web, allows a user at a Web browser, which may be any standard Web browser supported by a standard computing platform, posits a query that is routed to a Meta-Web server. The Meta-Web server routes the query to a search engine that returns search results to the Meta-Web server. The Meta-Web server then routes the results to a Meta-Web registry that, based on the search results and the content of the registry returns annotations and other meta-data to the Meta-Web server. The Meta-Web server uses the annotations and/or other meta-data to generate and route annotated pages to the browser and the user may then explore the results within the annotated pages, for example by clicking on a URL within the annotated pages.

Unique to the invention is the provision of the registry that receives the search results and provides annotations and/or other information to the Meta-Web server. The registry may also accumulate knowledge, meta-knowledge that was created at a time of entry of such knowledge, and meta-knowledge in the form of one or more annotations that accumulate over time, where the annotations include any of, but are not limited to, usefulness of said knowledge, additional user opinions, certifications of veracity of said knowledge, reputation (which may be based on a formal reputation system), commentary by users, and connections between the knowledge and other units of knowledge.

To create the annotated pages, the Meta-Web server either combines both the search results and information from the registry, or operates upon the search results in accordance with information contained in the registry. The search results are thus augmented or modified by the registry information under control of the Meta-Web server, which then builds the annotated pages. The annotated pages are then forwarded to the user's Web browser.

BRIEF DESCRIPTION OF THE DRAWINGS

FIG. 3 is a display showing the results provided to the user in response to the query of FIG. 2 according to the invention;

FIG. 6 is a display in which the user has selected one of the search results from the list of results of FIG. 3 according to the invention;

FIG. 7 is a display showing a pop-up window that provides answers to Frequently Asked Questions according to the invention;

FIG. 8 is a display showing the user has selected the related items button for the portion of text that is highlighted by the user according to the invention;

FIG. 9 is a display showing the user selecting only the documents in the related items and info window according to the invention;

FIG. 13 is a display showing a pop-up window that allows the user to look at information that has been obtained from diverse sources about a product according to the invention;

FIG. 15 is a display that shows a Meta-Web object according to the invention;

FIG. 17 is a display that shows a manufacturer's specification sheet which is displayed when the user selects a manufacturer specifications sheet button according to the invention;

FIG. 18 is a display which shows that the user has selected the buy button and can enter a personalized purchase transaction to bring the user to a preferred vendor according to the invention;

FIG. 20 is a display which is similar to that shown in FIG. 3, except that in this case the results relate to the user's query with regard to relevance to the user according to the invention;

FIG. 21 is a display which shows the user choosing the first document in the results set according to the invention;

FIG. 22 is a display which shows an article selected by the user from a list of results according to the invention;

FIG. 23 is a display which shows the selected document, where the user is not interested in the result according to the invention;

FIG. 24 is a display which shows the user selects a first document according to the invention;

FIG. 25 is a display which shows the selected document displayed according to the invention;

FIG. 28 is a display which shows a pop-up window that is spawned to ask the user to select the text that would be associated with a comment according to the invention;

FIG. 29 is a display which shows the user selecting text according to the invention;

FIG. 30 is a display which shows the user entering a comment according to the invention;

FIG. 34 is a display which shows the user is informed that the question with be forwarded to the author according to the invention;

FIG. 36 is a display which shows the user selecting the buy button according to the invention;

FIG. 39 is a display which shows that some icons appear darker while others appear lighter according to the invention;

FIG. 40 is a display which shows the user selecting the personal interest icon according to the invention;

FIG. 41 is a display which shows a list of vendors, with indication that several of the vendors have associated web sites according to the invention.

DETAILED DESCRIPTION OF THE INVENTION

Figure 1:
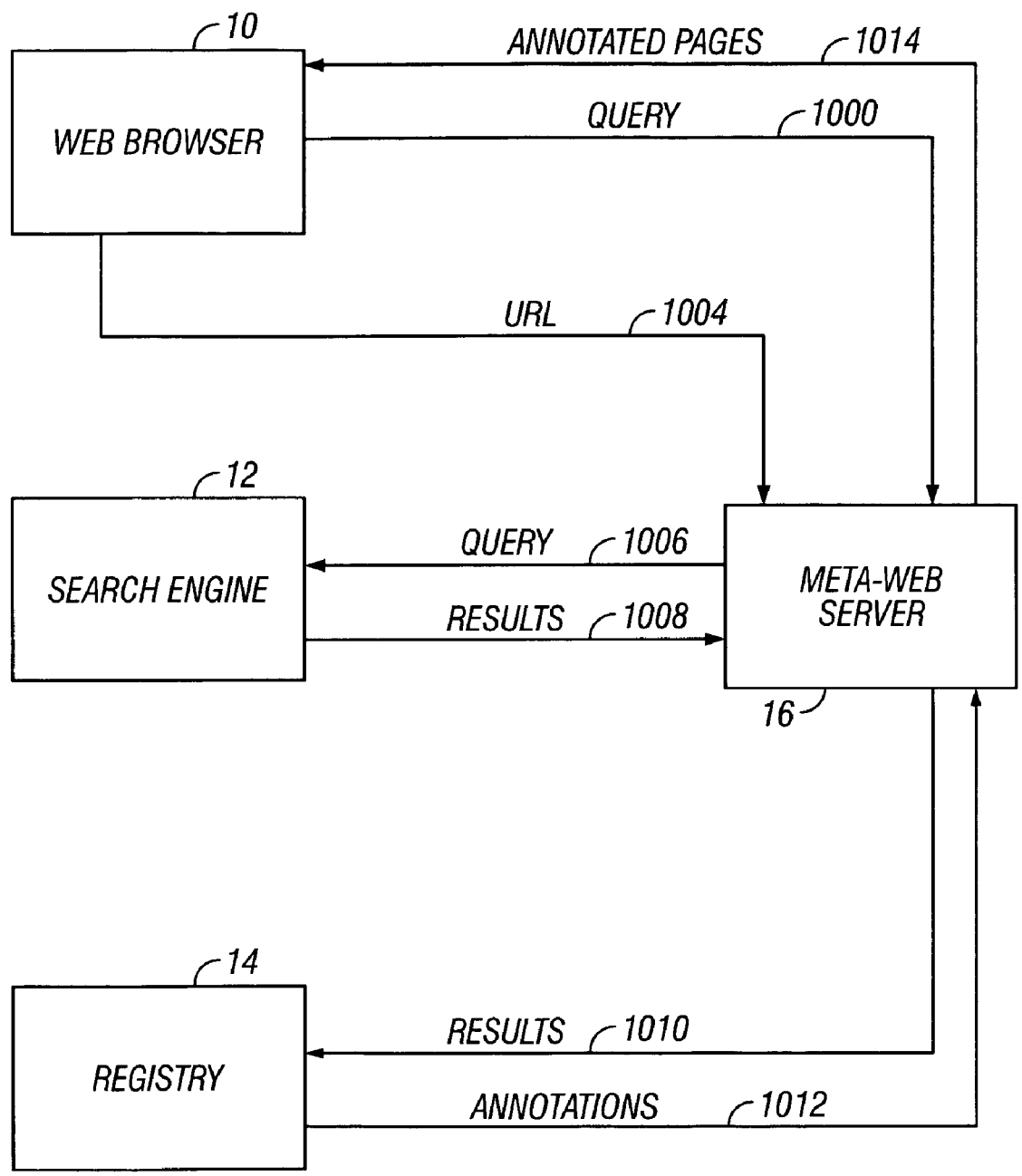
FIG. 1 is a block schematic diagram showing the architecture of the Meta-Web facility according to the invention.

FIG. 1 is a block schematic diagram showing the architecture of the Meta-Web facility disclosed herein. In operation, a user at a Web browser 10, which may be any standard Web browser supported by a standard computing platform, posits a query (1000) that is routed to a Meta-Web server 16. The Meta-Web server routes the query (1006) to a search engine that returns search results (1008) to the Meta-Web server. The Meta-Web server then routes the results (1010) to a Meta-Web registry (14) that, based on the search results and the content of the registry returns annotations and/or other meta-data (1012) to the Meta-Web server. The Meta-Web uses the annotations and/or other meta-data to generate and route annotated pages (1014) to the browser, and the user may then explore the results within the annotated pages, for example by clicking on a URL within the annotated pages (1004).

Unique to the invention is the provision of the registry 14 that receives the search results (1010) and provides annotations (1012) and/or other information to the Meta-Web server. The registry may also accumulate knowledge, meta-knowledge that was created at a time of entry of such knowledge, and meta-knowledge in the form of one or more annotations that accumulate over time, where the annotations include any of, but are not limited to, usefulness of said knowledge, additional user opinions, certifications of veracity of said knowledge, reputation (which may be based on a formal reputation system), commentary by users, and connections between the knowledge and other units of knowledge. Such connections comprise typed links between registry objects, where such links may comprise, for example, relationships, such as a person's role in an organization or a place where a person lives, and such objects may comprise, for example, representations of products, people, places, categories, events, organizations, roles, documents, portions of documents, certifications, ratings, dates, and times.

To create the annotated pages, the Meta-Web server either combines both the search results and information from the registry, or operates upon the search results in accordance with information contained in the registry. The search results are thus augmented or modified by the registry information under control of the Meta-Web server, which then builds the annotated pages. The annotated pages are then forwarded to the user's Web browser.

Accordingly, the presently preferred embodiment of the invention comprises four elements, i.e. a standard Web browser and a standard search engine, which are well known to those skilled in the art, and the registry and Meta-Web server. The registry associates metadata with objects, while the Meta-Web server creates Web pages dynamically, which are then sent to the user's Web browser for viewing by the user. While a Web browser is described herein in connection with the presently preferred embodiment, those skilled in the art will appreciate that other access facilities may be used to practice the invention. As well, the search engine may comprise any type of data access facility. Key to the invention is the provision of the Meta-Web server and registry. Further, while the Meta-Web server and registry are discussed herein as separate elements, their functionality may be combined into a single element. Likewise, their functionality may be dispersed broadly across several elements. For example, a knowledge base comprising knowledge, meta-knowledge that was created at a time of entry of said knowledge, and meta-knowledge in the form of one or more annotations that accumulate over time, the annotations including any of, but not limited to, usefulness of said knowledge, additional user opinions, certifications of veracity of said knowledge, commentary by users, and connections between said knowledge and other units of knowledge may comprise an element of the invention, see U.S. patent application Ser. No. 10/474,155, filed 10 Apr. 2002.

The Meta-Web server as presently embodied creates two types of Web pages, both of which are described in the discussion below and in the Figures accompanying that discussion. One of the Web pages is a Web page that consists of search results with annotations. The other type of Web page is a Web page that consists of a content page with an annotation tool, such as an annotation bar at the side of the results page. In the preferred embodiment, the annotation bar is incorporated into a standard Web browser, but in other embodiments it may be part of a separate Meta-Web application which runs on the user's computer, or it may be an element that is spawned by operation of the user's Web browser, such as a Java applet or JavaScript.

Content displayed to the user is dynamically extracted from the registry by the Meta-Web server. Known techniques for displaying this information include framing, HTML, cascading style sheets, and the like. As discussed in detail below, the architecture herein disclosed provides annotations, search results, and other information in a standard Web browser, as well as a suite of tools for interacting therewith.

The Meta-Web server constructs a search query page which includes a field into which a user can enter one or more search terms. Standard searching techniques, such as Boolean operations, are supported. The query page is delivered to the user's Web browser as a search form. The search form may resemble well known search forms, such as those provided by Google® or it may be presented in any other appropriate format.

When the user enters a query into the search form, the query is forwarded to the search engine by the Meta-Web server. In the preferred embodiment, a user query is processed by the Meta-Web server. Thus, a Web page is constructed by the Meta-Web Server in response to the query when a query is directed to the Meta-Web server from the user via the user's Web browser. Rather than providing results from the search engine directly to the user, the Meta-Web server examines the search results and then performs a look-up in the registry to determine if there are annotations or other information associated with the search results that might be used, for example, to order the results in terms of relevance or other orderings. Likewise, the Meta-Web server may consult the registry prior to positing the query to the search engine. The Meta-Web server may then modify the query or search space and, thereafter, submit the query to the search engine.

Any annotations or other metadata found in the registry may be added to the search results. The Meta-Web server then dynamically constructs a presentation for the user which is returned to the user. The form of the presentation may be controlled by a preference set by the user in the user's Web browser, based upon a user profile stored in the registry, or any combination thereof.

Metadata may be used by the Meta-Web server to check a query term in the registry and determine if there is a prepared way of presenting the data in connection with the term. For example, if there is a common term, it may be determined that the registry has a standard presentation or query results for that term, and that that presentation is preferred over other presentations. Thus, as an alternative to dynamic assembly of the Web page, the registry may provide the Meta-Web server with a preformed response for the query.

One embodiment of the invention provides a relevance button that may be displayed to the user to create a display item which explains the relevance of a term.

In another embodiment, the user may select an item and instead of returning the Web page to the user, that aspect of the search would be framed in the Web page with an annotation bar as discussed above. Thus, the Meta-Web server adds the annotation bar to the Web page to provide the user with the ability not only to comment on relevance or usability of the search result, but to add annotations as desired. Such annotations are then stored in the registry for further use. The annotations are thereafter linked to that user's search space so that further queries by the user bring up the annotations. Further, the annotations may be linked for all uses of that term so that queries by other individuals also produce the annotations entered by the user through the annotation bar. In this way, a community of annotations is assembled which is associated with a particular query term or search result. These aspects of the invention are discussed in greater detail below.

Thus, the presently preferred embodiment of the invention provides selected content within a frame and provides additional frames for annotations, as well as a tool bar for entering and editing annotations. The Meta-Web server dynamically creates the frame for this page and collects the content and annotations to create the complete page. In another embodiment, HTML or XML may be used to accomplish a similar purpose. Additionally, the Meta-Web server may incorporate active components, such as JavaScript or Java applets to provide additional functionality to the user during the annotation process, and may also employ cascading style sheets.

If the content selected by a user relates to a product, i.e. the URL selected by the user leads to a product node, then the Meta-Web server can perform an independent search to collect data with regard to that particular product and dynamically create a Web page for the user that includes information collected in real time. Alternatively, the additional information may be associated with the product in the registry and the Meta-Web server associates the registry information with the product.

Various schemes are envisioned by which the registry, under direction of the Meta-Web server, may be independently updated to refresh or enhance this information. For example, a particular product may be the subject of additional independent searching under control of the Meta-Web server when a certain number of requests are made for a particular product, or when a particular interval has elapsed since the last query concerning the product. Further, independent events, such as discontinuation of a product, may trigger Meta-Web server activities.

The Meta-Web server may identify products within a Web page provided to a user as a result of a user's request for content. Thus, the Meta-Web server identifies product terms or other terms in a page of content, for example by highlighting or underlining, indicating that additional information is available to the user for those products or terms. For example, the user may be performing a search for a particular class of products and within the content a particular product is mentioned. If that product is highlighted, then the user is made aware that the Meta-Web server has identified related information in the registry. The user may then select that highlighted term and the information in the registry is then provided to the user.

For example, if the name of a product is identified, a product node may be selected and annotations associated with it may be provided to the user. Further, the Meta-Web server may provide a filter for those annotations to determine which annotations are of interest to the user, depending on the user profile or user preferences. These annotations can include offers by various merchants to sell the product and other information that may be of interest in connection with the product.

In the event of a filter being applied, the filter may be based on a user profile that may be stored in one of several places. For example, a Web site visited by the user could store a cookie related to the user. In this case, the user could automatically be logged in to the Meta-Web server or at a site being visited, all as a result of a cookie. The Meta-Web server could also keep a profile of the user in a separate database or it could use the registry database. The profile itself may comprise, for example, trusted reputation systems (see, for example, U.S. Provisional Patent Application entitled "Reputation System," Ser. No. 60/529,245, filed Dec. 12, 2003, U.S. Ser. No. not yet assigned), preferred vendors and areas of specific user competence, interest, or understanding.

Figure 2:
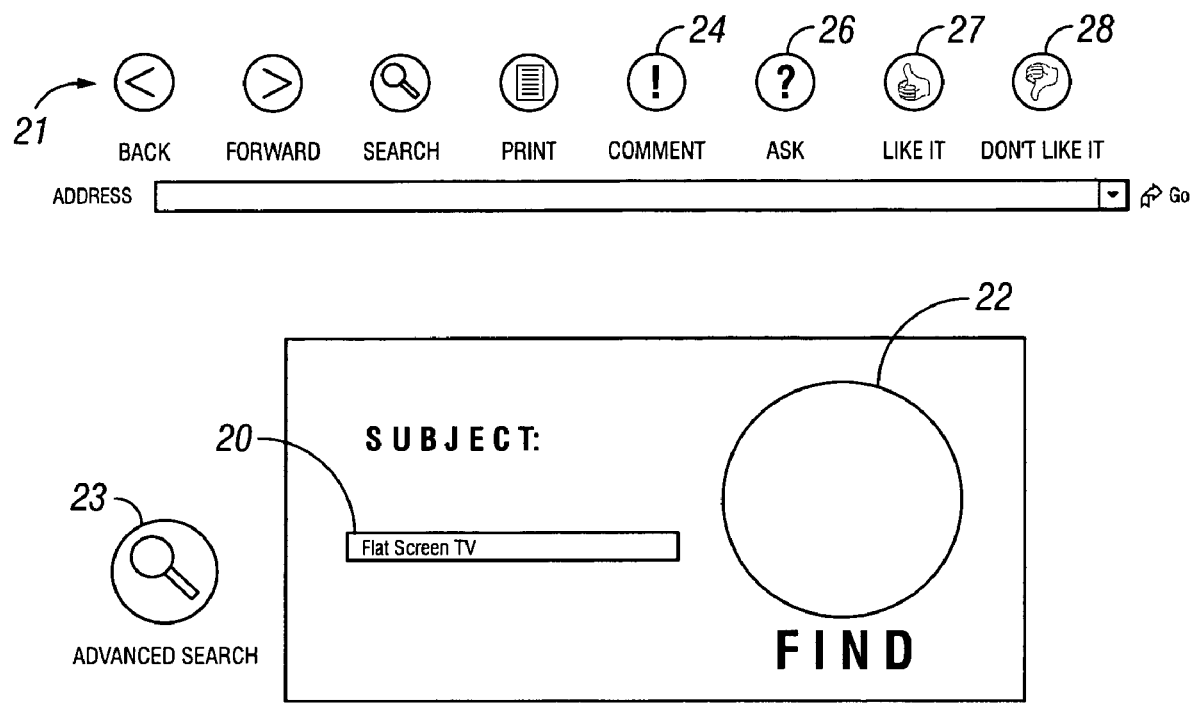
FIG. 2 is a display showing a subject field which includes a portion into which the user may enter a search query according to the invention.

In FIG. 2, a subject field 20 is provided which includes a portion into which the user may enter a search query. When the user has finished composing the query, the user may select the find button 22, and the query is then passed to the Meta-Web server where it is executed.

The invention, also includes an annotation bar 21, as discussed above, which is dynamically added to any content, such as search results, that is served to the user by the Meta-Web server. The annotation bar may include user-actuated buttons which provide such functions as allowing the user to comment 24, ask questions 26, indicate that the information is relevant 27, or indicate that the information is not relevant 28. Such buttons may be, for example, special local tools embedded in a browser or part of a separate local tool application, or, they may be incorporated into a modified results page.

The invention is envisioned as having many applications. One application of the invention concerns a product purchase, where the user is looking to buy a product on-line after getting information about it. In this example, the user types in a search expression in the subject field 20. In the example of FIG. 2, the user is looking for information on a flat screen TV.

Figure 4:
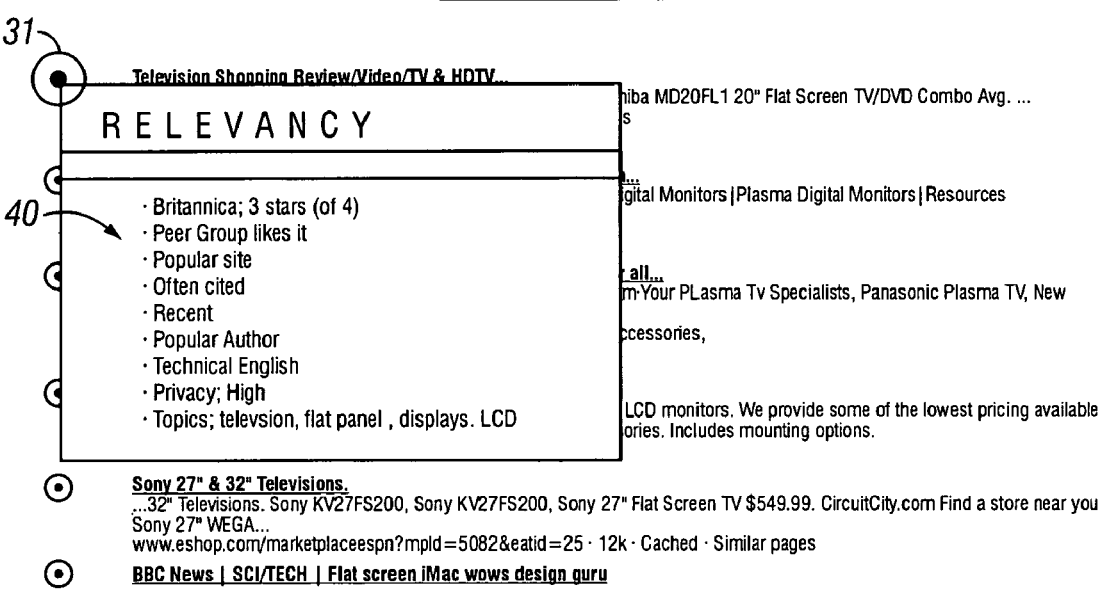
FIG. 4 is a display showing a pop-up window which provides information regarding the relevancy to the user of the search results of FIG. 3 according to the invention.

FIG. 3 is a screen shot showing the results provided to the user in response to the query for a flat screen TV. The results are sorted in a way that is personalized for the user. Thus, various icons may be provided near the results. As shown in FIG. 3, the entry "Television Shopping Review/Video/TV & HDTV" is accompanied by an icon 31 that appears in FIG. 3 to be darker, while the entry "Net-TV vs. Sony Panasonic digital flat screen TV's pure plasma" is accompanied by an icon 32 that appears to be lighter. The significance of the various icons is discussed below. If the user selects the darker icon 31, then a pop-up window 40 provides information regarding the relevancy to the user of the search result, as shown in FIG. 4.

Figure 5:
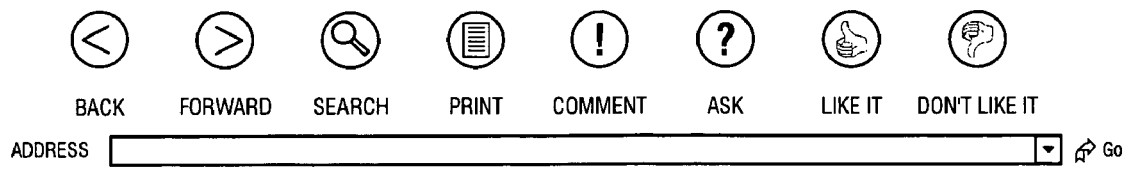
FIG. 5 is a display showing a pop-up window which shows relevancy of the search results by indicating that the search results include something of personal interest to the user according to the invention.

As shown in FIG. 5, if the lighter icon is selected, then a pop-up window 50 also shows relevancy of the search result, but the lighter color indicates that the search results include something of personal interest to the user, such as an endorsement by a personal friend. This can be seen in the pop-up window 50 where it is indicated that the document was recommended because "Stewart Brand likes it." In this example, Stewart Brand is a friend of the user. The assembly of the information into this format is performed by the Meta-Web server based upon the combining of information contained in the registry and the search results, as described above.

While the examples herein show icons which indicate relevancy by having lighter or darker intensity, the context of indication provided by the icons and the constituency of the icons is a matter of choice for those skilled in the art. Thus, the icons may flash, may be of different colors, may of different shapes, and the like. Further, a user may be alerted by device other than icons, such as audible beeps, and the like.

FIG. 6 is a screen shot in which the user has selected one of the search results 60 from the list of results 30, see FIG. 3. Various gray icons 61 are shown at the right hand side of the display. The upper icons refer to the entire document and include relevancy 62, information 63, and buy 64. The bottom icons relate to a portion of the document, for example a user highlighted portion of the document, and include the availability of FAQs 65, additional information 66, and an option to buy 67 the product.

In FIG. 7, the user has selected the FAQs button 65 and a pop-up window 70 provides answers to Frequently Asked Questions. The FAQs associated with the document concern that part of the document which is highlighted by the user 71. Thus, the invention contemplates that the user can select portions of documents, which are then used by the Meta-Web server to identify annotations in the registry and dynamically generate FAQs relating thereto. Highlighting may also be accomplished automatically by the Meta-Web server, for example, in response to a user query, where the query terms are used to highlight relevant portion of a document.

In FIG. 8, the user has selected the related items button 66 for the portion of text 80 that is highlighted by the user. As a result, a pop-up window 81 provides related items and information for the highlighted text. As above, this information is assembled dynamically by the Meta-Web server in connection with the registry.

In FIG. 9, the user selects only the documents 91 in the related items and info window 81.

Figure 10:
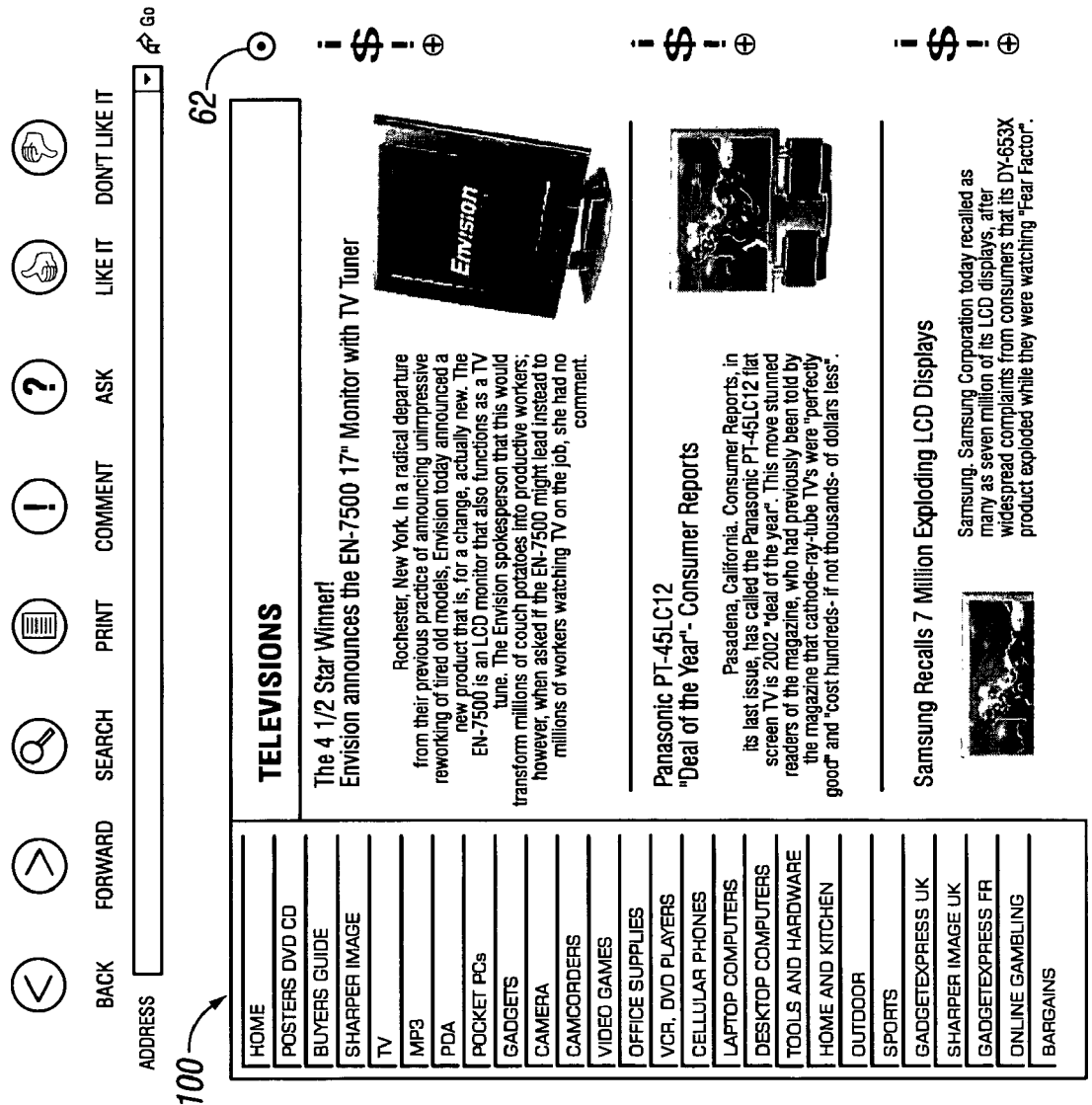
FIG. 10 is a display showing the selected document displayed with its own annotations according to the invention.

In FIG. 10, selected document 100 is displayed with its own annotations. Each document has a unique set of annotations. In the example of FIG. 10, the relevancy icon 62 is illuminated to indicate that there is a comment of personal value or interest to the user.

Figure 11:
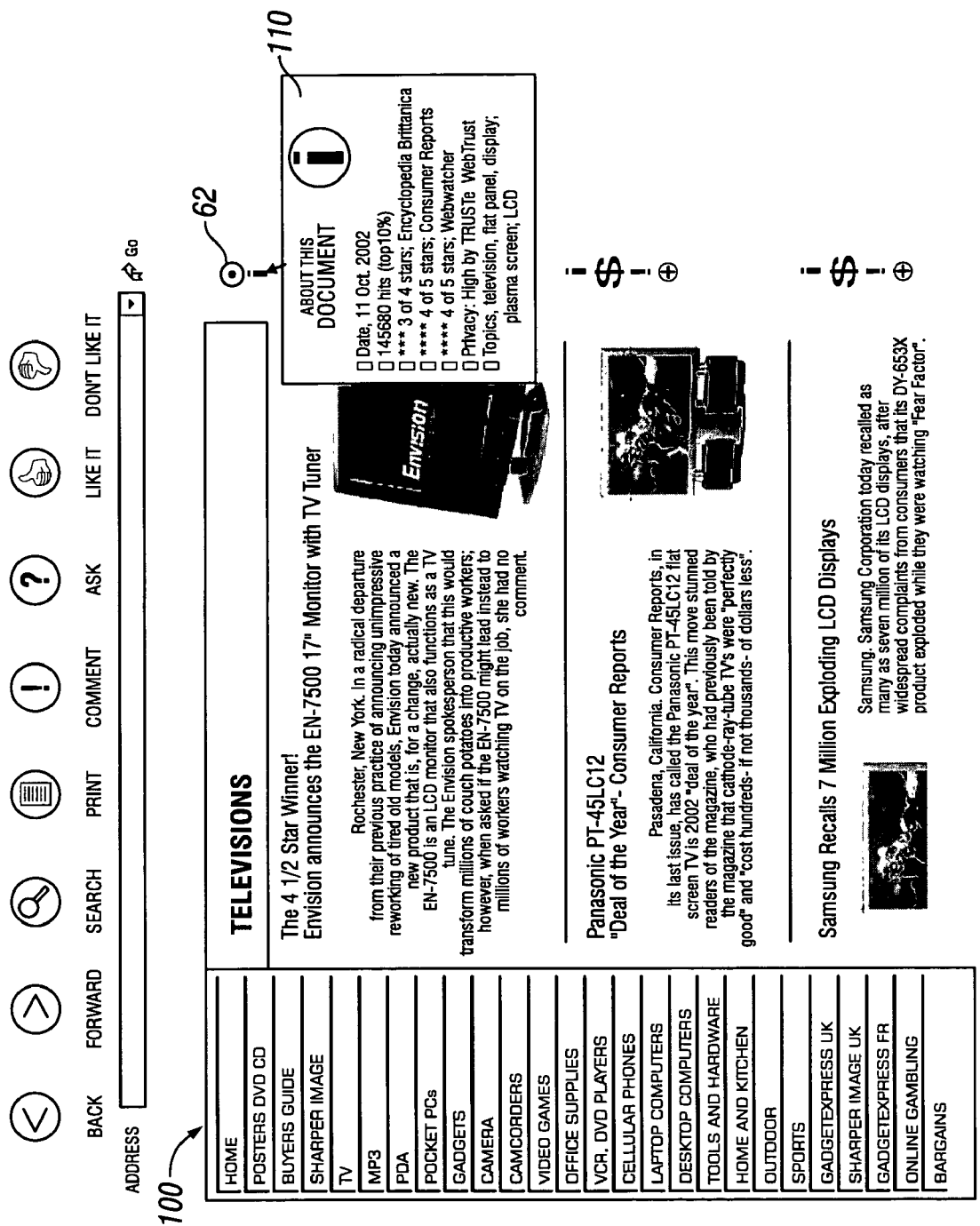
FIG. 11 is a display showing a pop-up window that provides information of interest to the user according to the invention.

In FIG. 11, the user has selected the relevancy icon 62 and a pop-up window 110 provides the information of interest to the user. In this case, a window "about this document" is spawned that provides various data gathered from diverse sources that are relevant to the user.

Figure 12:
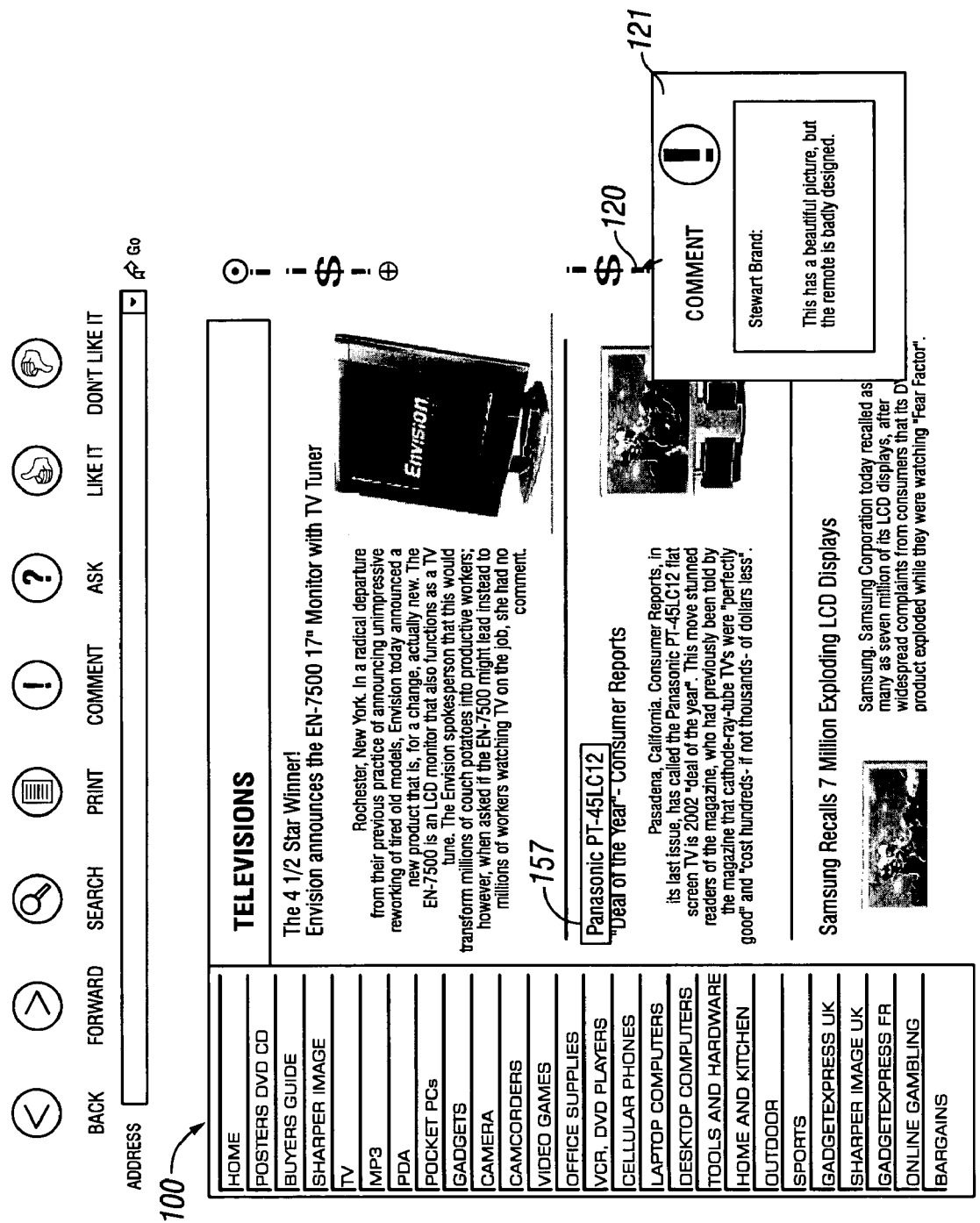
FIG. 12 is a display showing a comment window according to the invention.

In FIG. 12, the user has highlighted the product "Panasonic PT-45LC12," as shown by the box 157 which surrounds the product name. The user has also selected a comment icon 120 which spawns a comment window 121 for the selected product. In this case, a message from a personal friend is displayed. The comment is associated with a product name. Note that the friend in this case has annotated the product but not the particular document that the user is currently viewing. Here, the Meta-Web server has linked Stewart Brand's comment about the product to the product itself, and it has linked the product to the document, as well as to Stewart Brand and to the current user, to display the annotation shown. Thus, various connections have been formed by the Meta-Web server based on the personal information of the user and other information, all of which reside in the registry or within the realm of resources available to the Meta-Web server.

Figure 13:
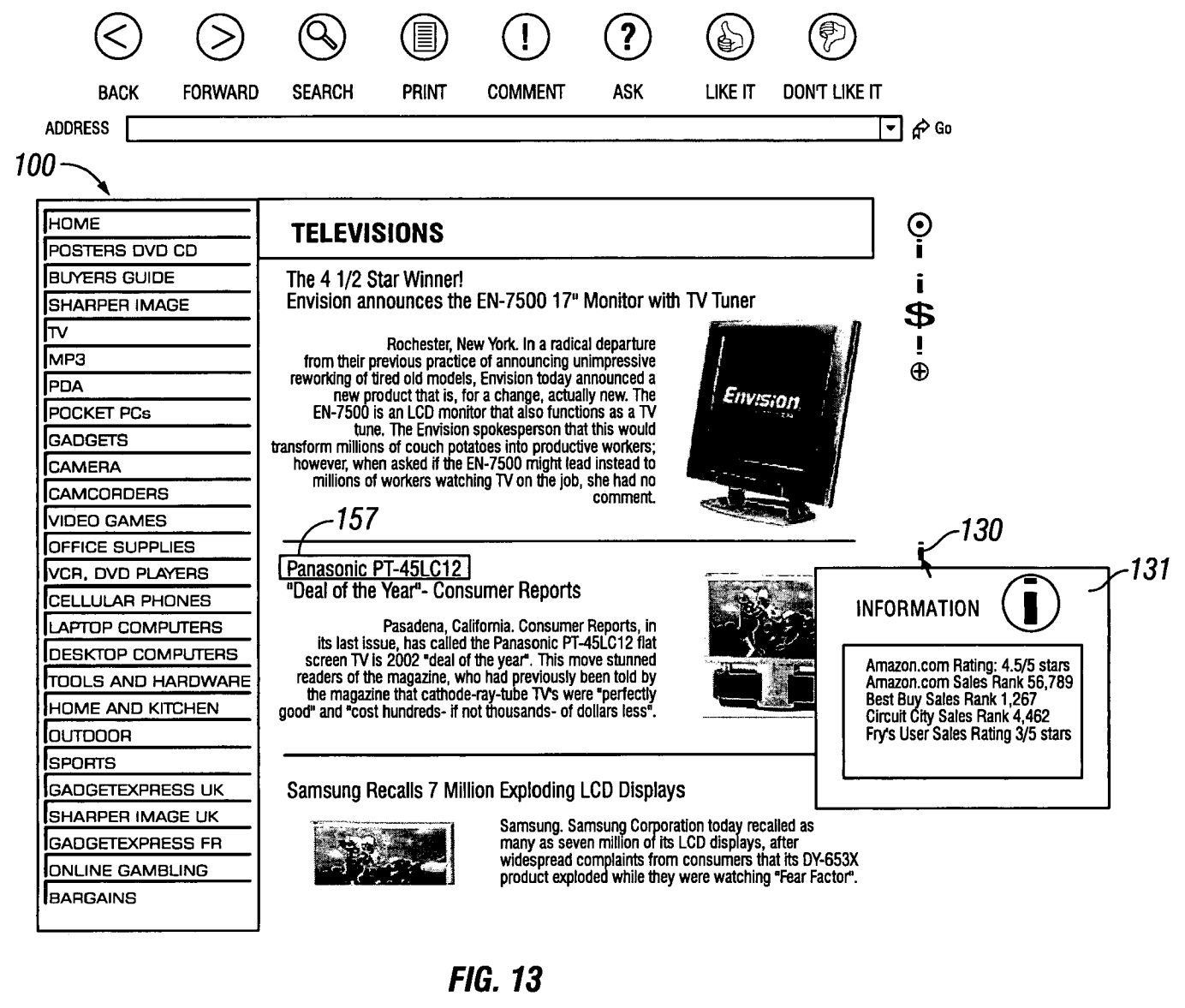

In FIG. 13, the user has selected an information icon 130 which spawns a pop-up window 131 that allows the user to look at information about the product that has been obtained from diverse sources.

Figure 14:
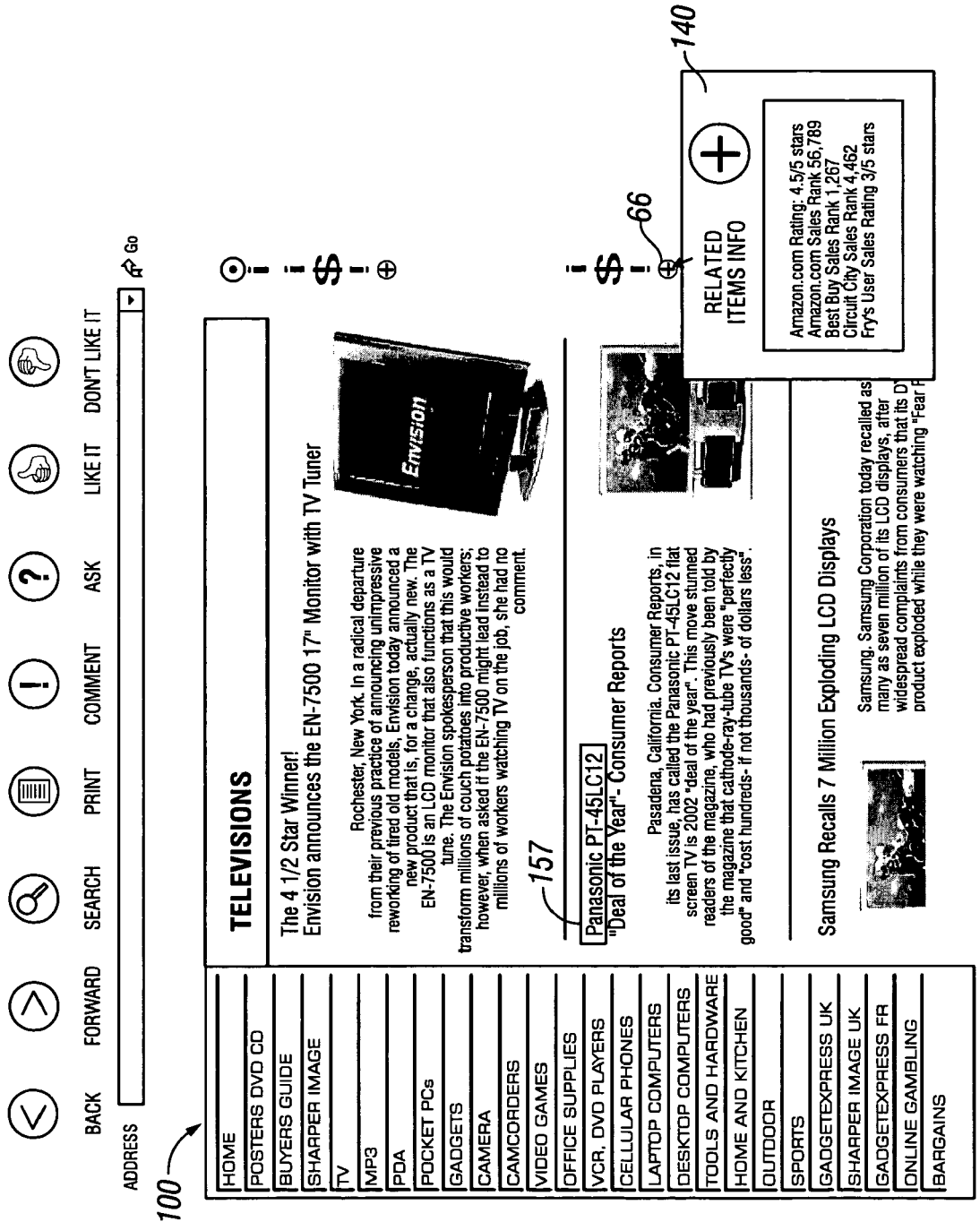
FIG. 14 is a display that shows that the user has selected a related items icon according to the invention.

In FIG. 14, the user has selected a related items icon 66. The Meta-Web server then spawns a related items window 140 in which the user finds a product node for the user highlighted product, as discussed above. The product node is an abstract Meta-Web object that is constructed by the Meta-Web out of all the information relating to the product. In this case, the node is a ranked list of information.

Figure 15:
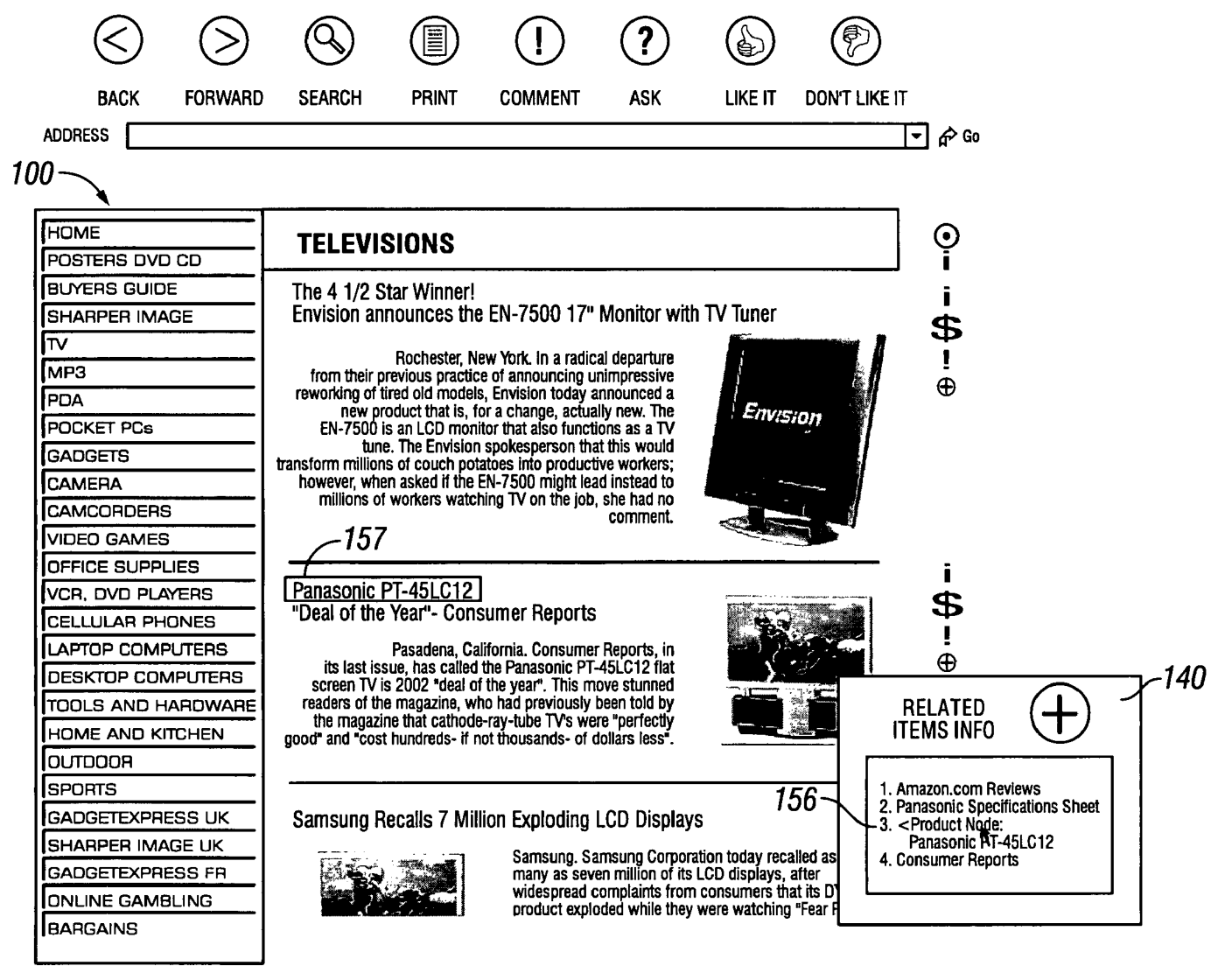

As shown in FIG. 15, the user selects the item <Product Node: Panasonic PT-45LC12> 156 from the related items window.

Figure 16:
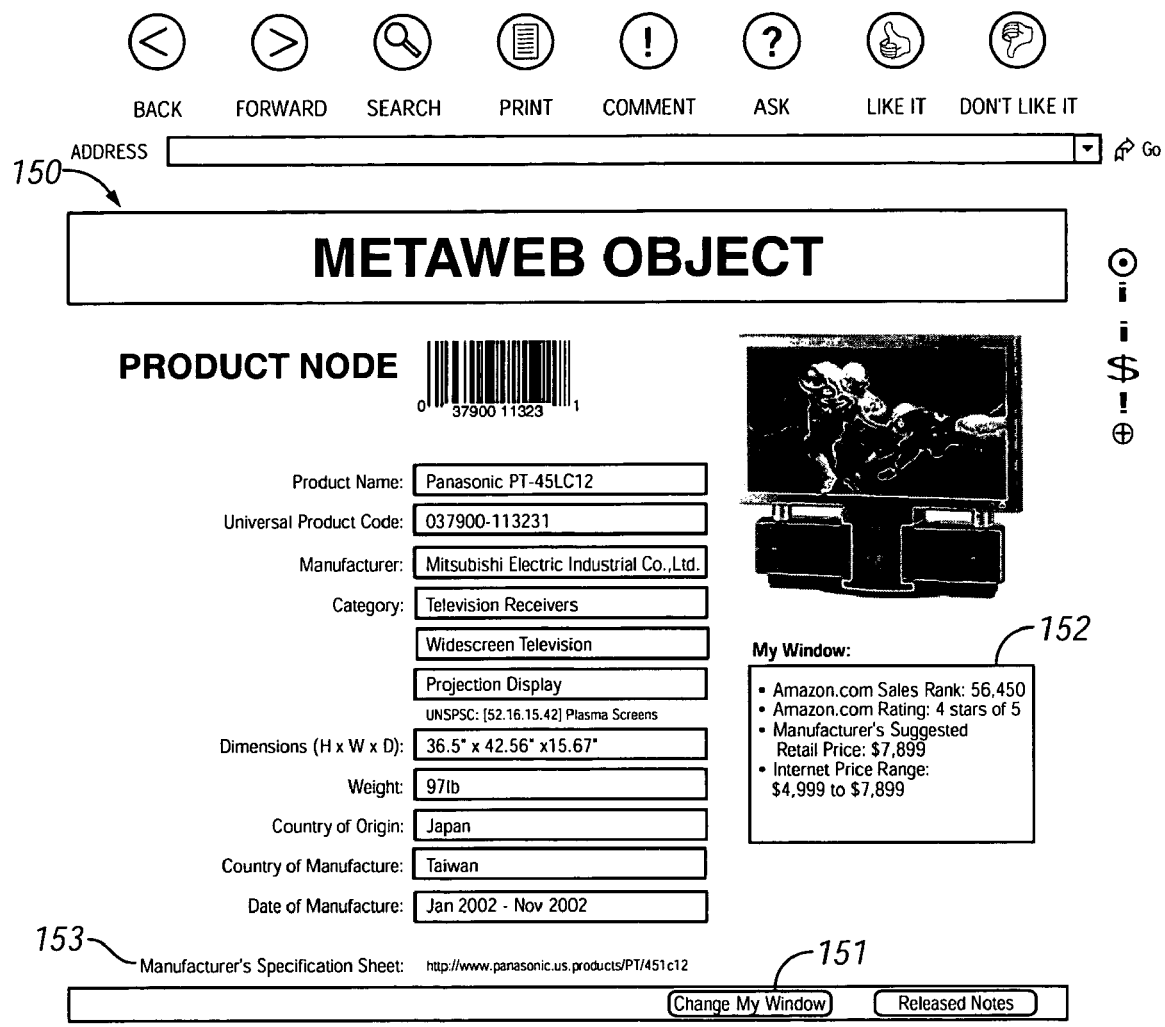
FIG. 16 is a display that shows a "change my window" button that allows the user to change the appearance of the information according to the invention.

FIG. 16 is a display that shows a Meta-Web object 150 which is a representation of a product node that is dynamically created by the Meta-Web to group together all the information relating to a product. In the example of FIG. 15, the user interface had been tailored for a particular user through user profile and preference information. Those skilled in the art will appreciate that any of standard and personal formats may be provided for the display. In the example of FIG. 16, a "change my window" button 151 is provided to allow the user to change the appearance of the information. By selecting the "change my window" button the user's "my window" presentation 152 may be changed.

Figure 17:
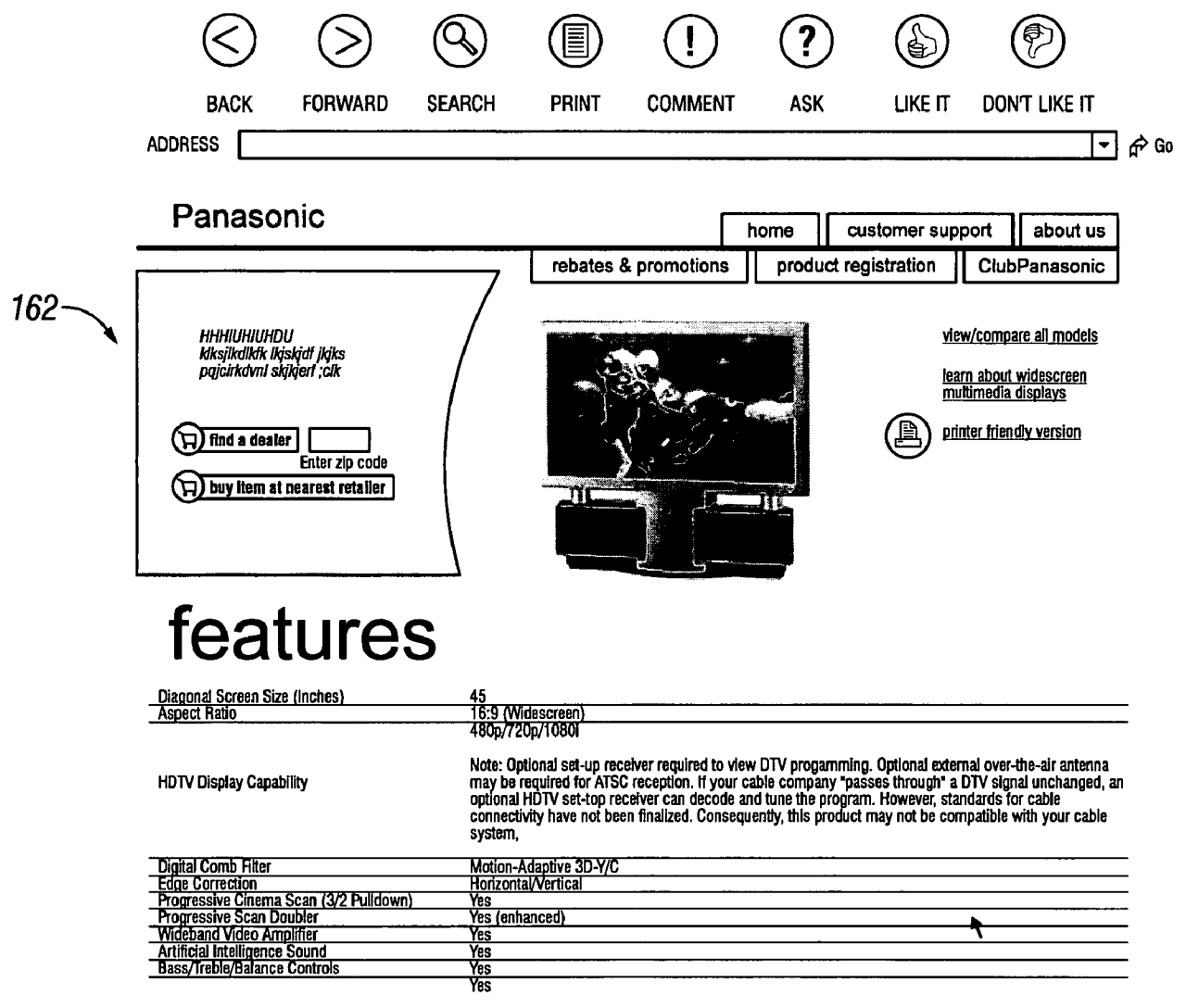

If the user selects the manufacturer specifications sheet button 153, the manufacturer's specification sheet 162 is displayed (see FIG. 17). The annotations discussed above are associated with the manufacturers specifications sheet as well.

Figure 18:
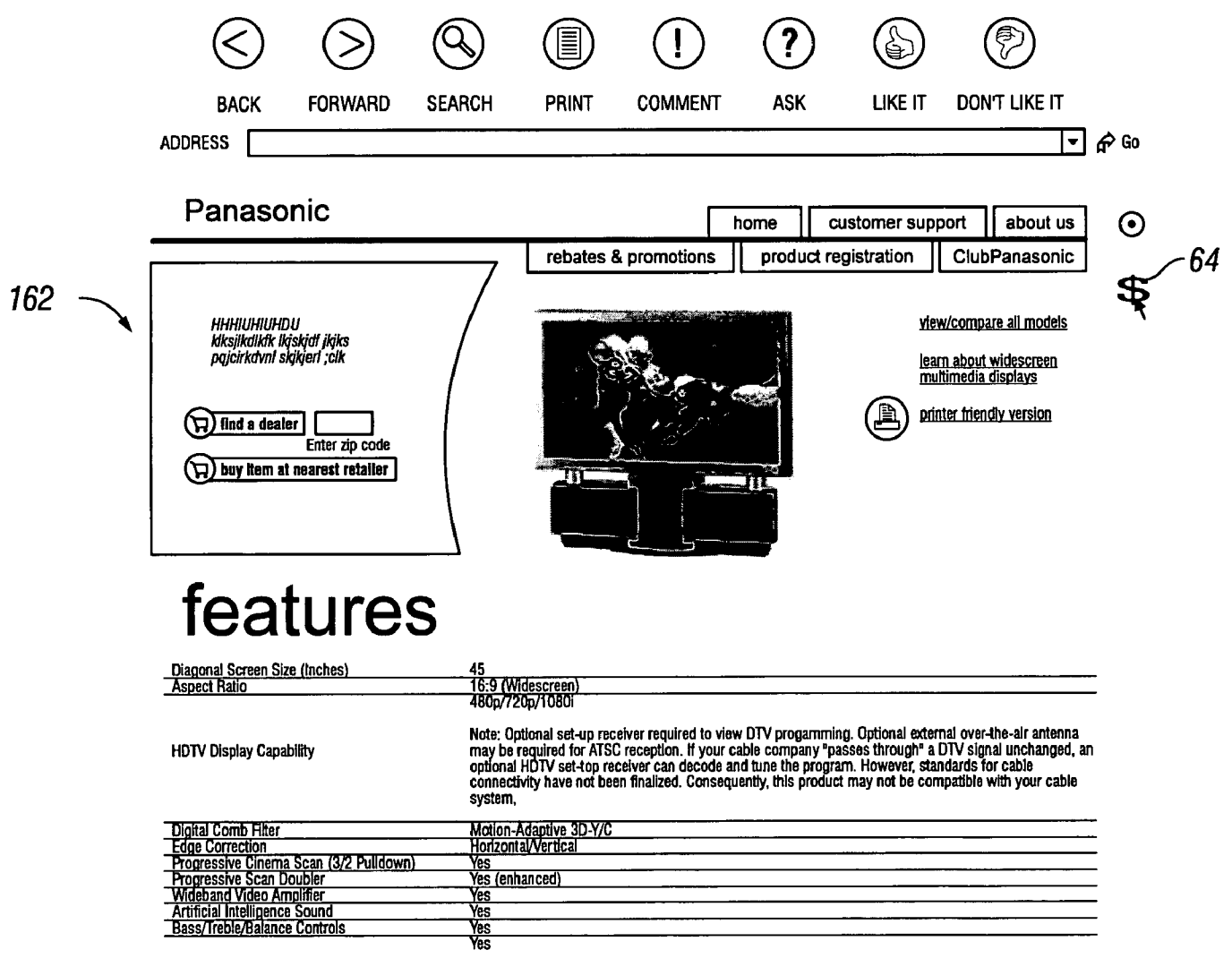

In FIG. 18, the user has selected the buy button 64 and can enter into a personalized purchase transaction to bring the user to a preferred vendor or list of vendors. In various embodiments in the invention, the user's wallet or other personal information may be linked to the Meta-Web server such that the user's purchase transaction may proceed in an automated fashion.

Figure 19:
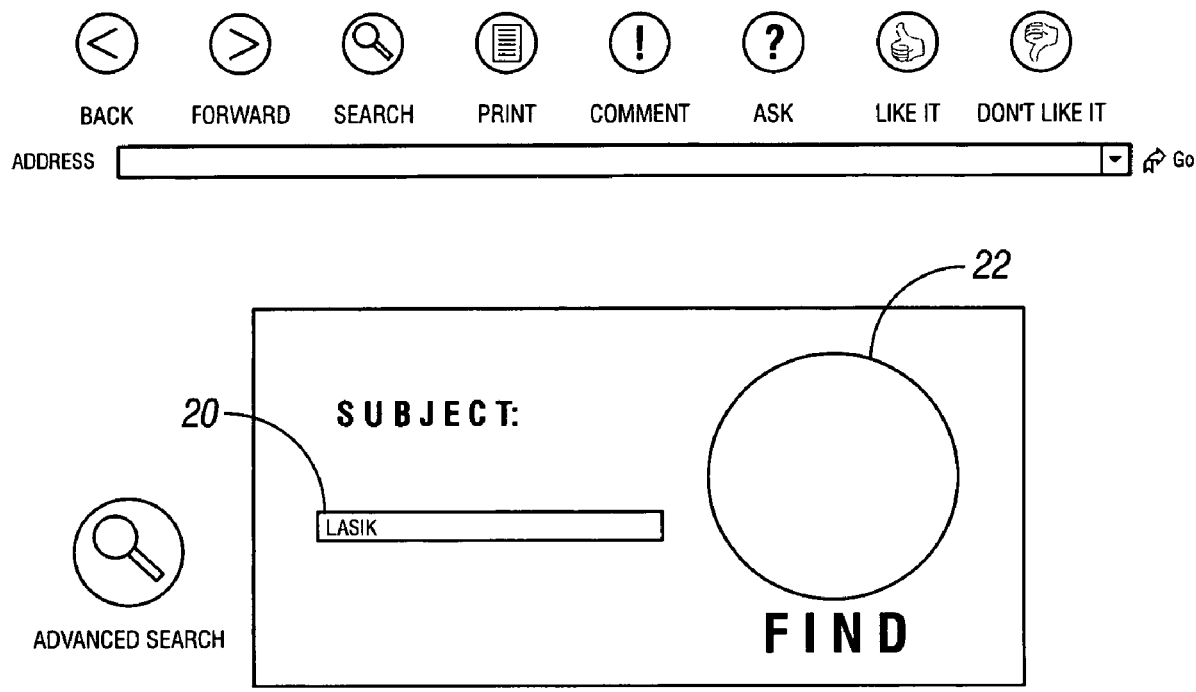
FIG. 19 is a display which shows an information-seeking problem where the user is looking to find information about a more complex product or service according to the invention.

A further example of the invention is concerned with an information-seeking problem where the user is looking to find information about a more complex product or service. In this example (see FIG. 19) the user is interested in LASIK eye surgery and enters that term into the search field 20.

As shown in FIG. 20, a screen similar to that shown in FIG. 3, described above, is assembled by the Meta-Web server and returned to the user, except in this case the results 190 relate to the user's query with regard to LASIK and the results have been ordered with regard to relevance to the user.

Figure 26:
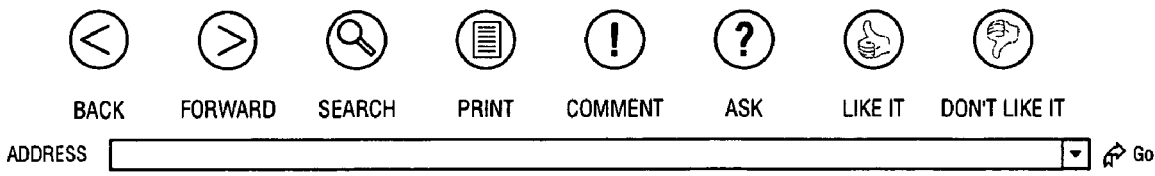
FIG. 26 is a display which shows the user has scrolled to the end of the selected document according to the invention.

As shown in FIG. 21, the user chooses the first document 200 in the results set. The selected document 210, see FIG. 22, turns out to be a technical paper on eye surgery, but the user is not interested in this result. Rather than go back to the results screen, the user selects the "Don't like it" button 28, see FIG. 23. This action updates the user's profile via the Meta-Web server and takes the user back to the results screen, see FIG. 24. The Meta-Web server has used the updated user profile in this case to re-write the result list 198. Accordingly, the user now sees a different results screen with documents that are more likely to be useful. The user selects the first document 230 (FIG. 25). The selected document 240 (see FIG. 26) is displayed. Note that there are annotations available for the document as indicated by the icons at the right side of the document.

Figure 27:
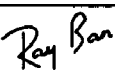
FIG. 27 is a display which shows the user selecting the comment button according to the invention.
Figure 28:
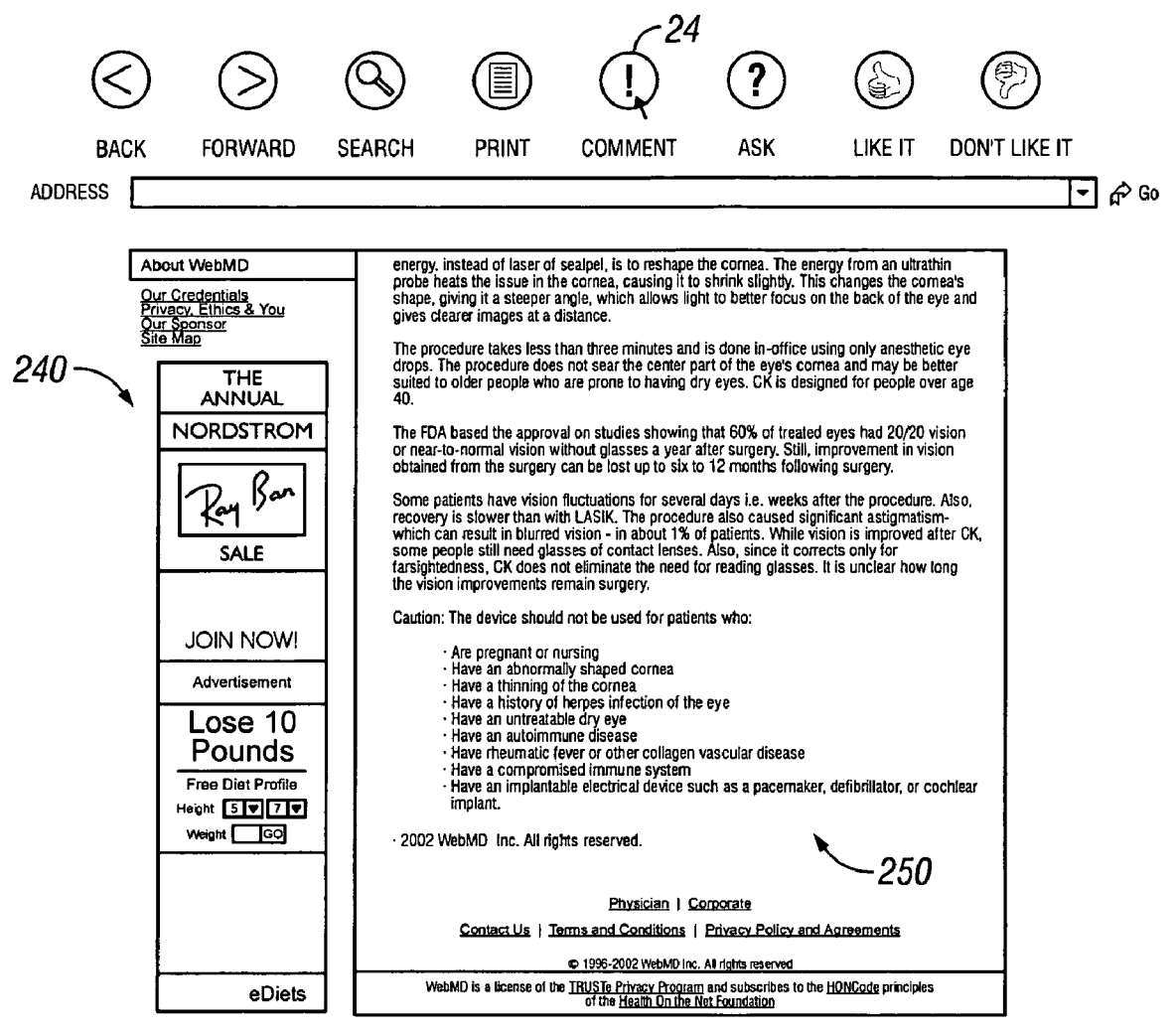
Figure 29:
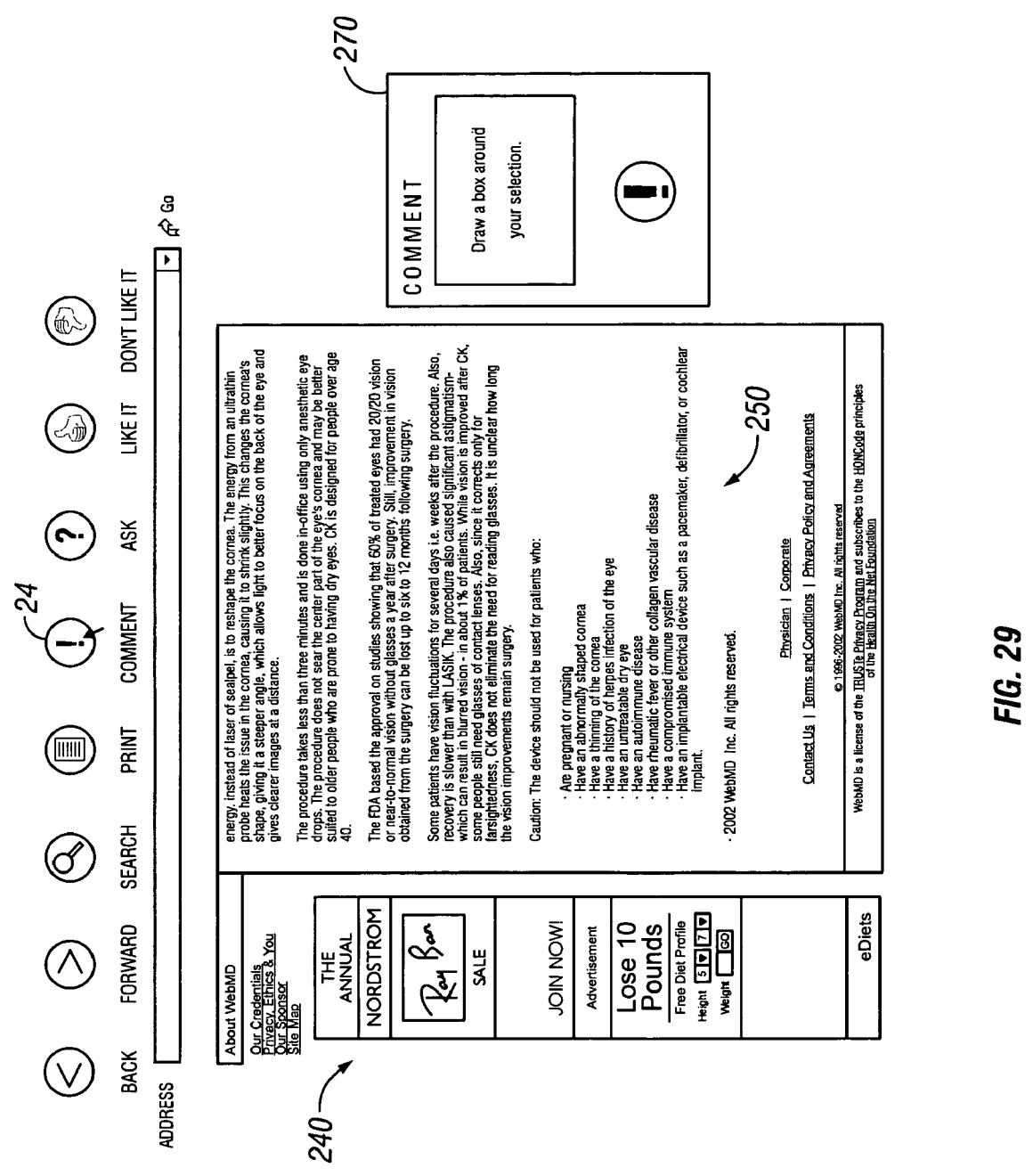
Figure 30:
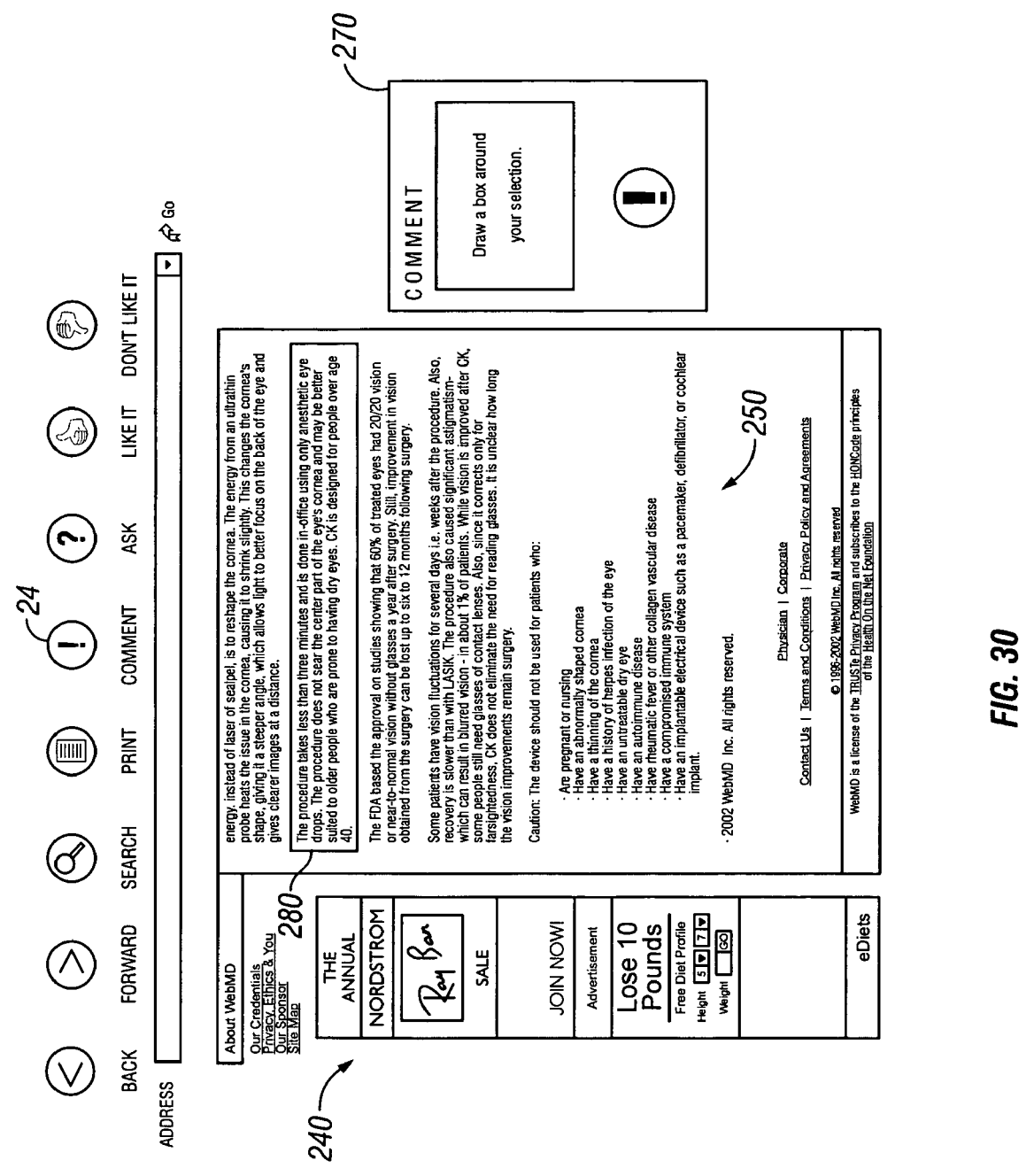
Figure 31:
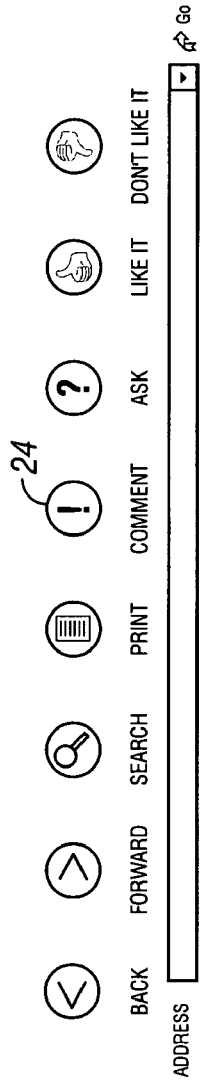
FIG. 31 is a display which shows the user submitting a comment to the Meta-Web server by selecting a submit button according to the invention.
Figure 32:
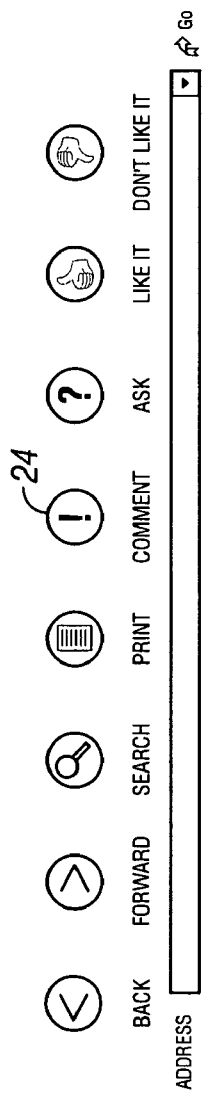
FIG. 32 is a display which shows the comment icon highlighted to show that there is a comment of personal interest to the user according to the invention.
Figure 33:
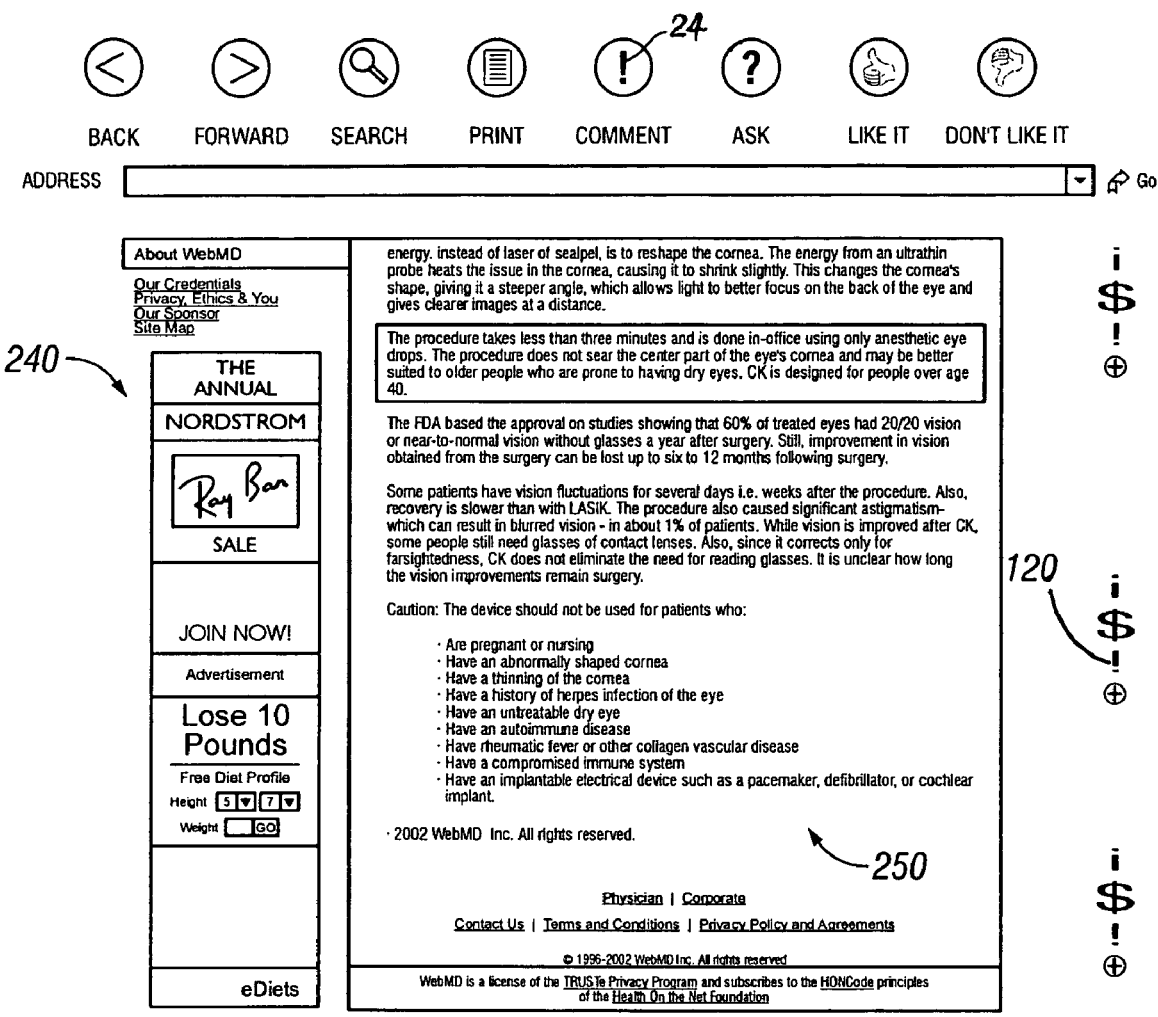
FIG. 33 is a display which shows the user is about ask to a question related to the document according to the invention.

As shown on FIG. 27, the user has scrolled to the end 250 of the selected document 240. The user selects the comment button 24 (FIG. 28). This allows the user to add a comment to the document. A pop-up window (FIG. 29) is spawned to ask the user to select the text which comprises an excerpt of the document that is to be associated with his comment. As shown in FIG. 30, the user selects the text document indicated by drawing a box 280 around the text. The user then enters his comment 290 (FIG. 31). Next, the user submits his comment to the Meta-Web server by selecting a submit button 300 (FIG. 32) and the registry is updated to include the user comments. The comment icon 120 is now highlighted to show that a comment of personal interest has been entered by the user (FIG. 33).

Figure 34:
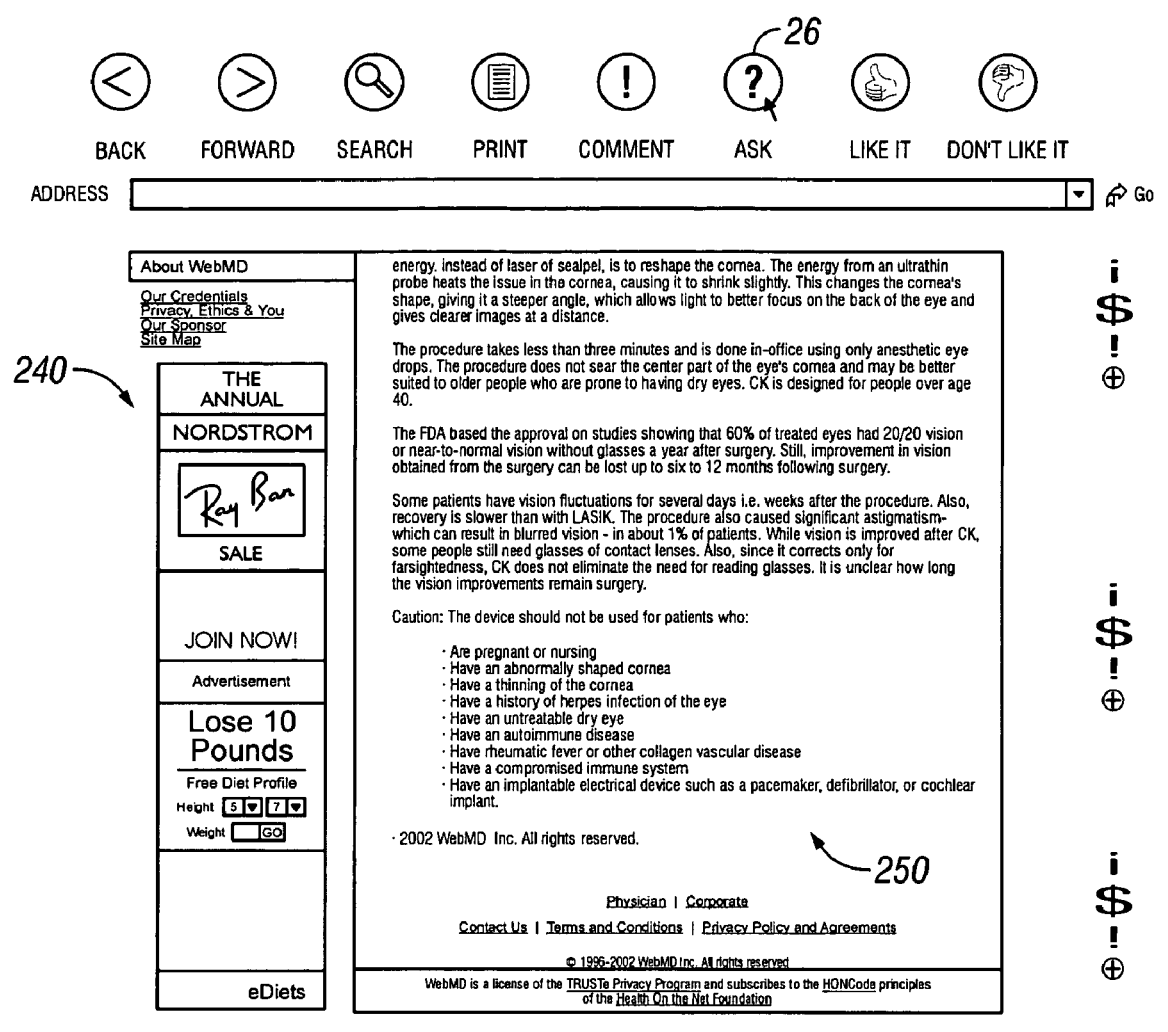
Figure 35:
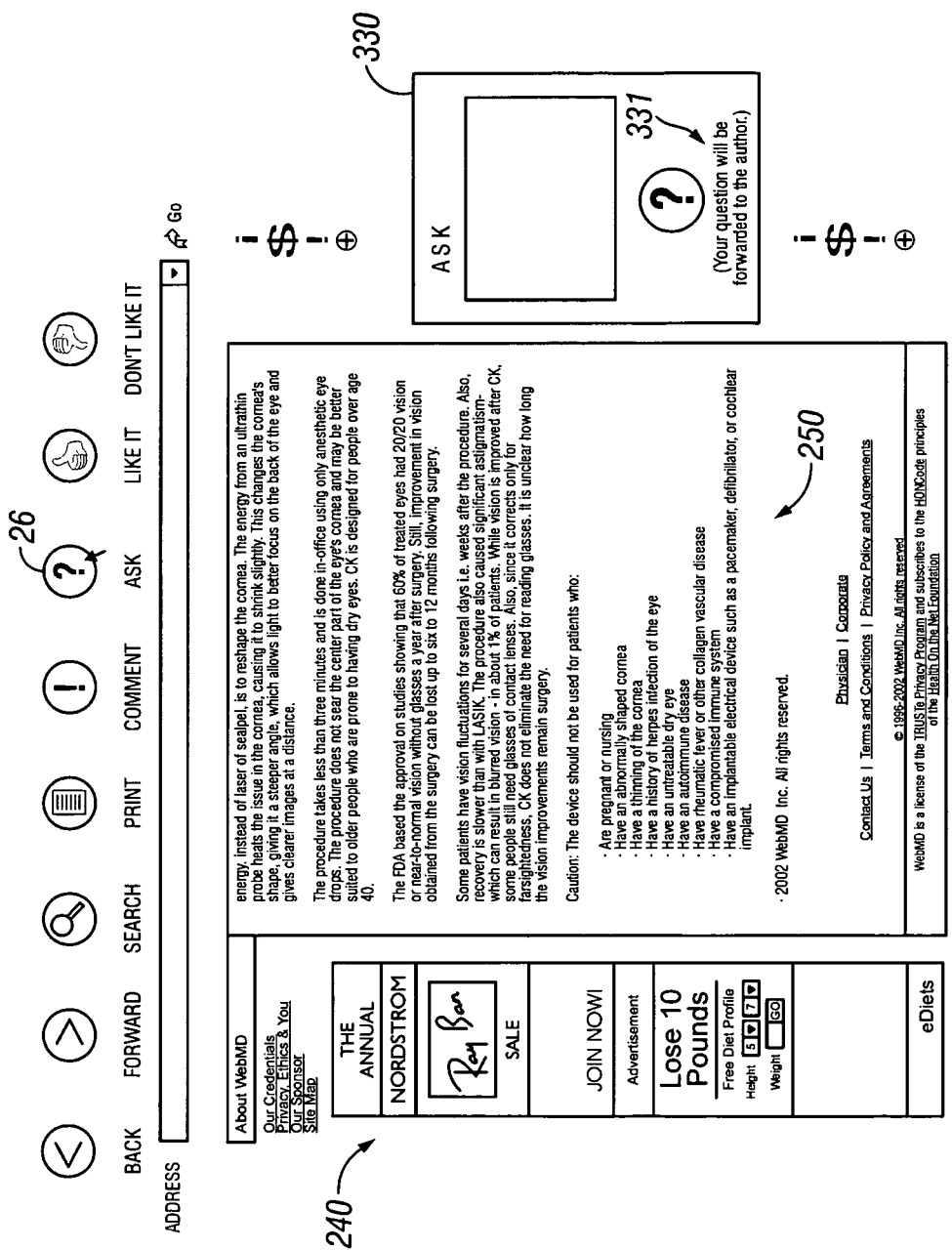
FIG. 35 is a display which shows a user selecting the ask button, where the Meta-Web server spawns an ask window into which the user may enter a question according to the invention.

In FIG. 34, the user is about to ask a question related to the document. In this case, the user selects the ask button 26. The user is informed that the question with be forwarded to the author 331 (FIG. 35). Other documents may have different mechanisms for dealing with questions, in addition to forwarding the question to the author.

Figure 36:
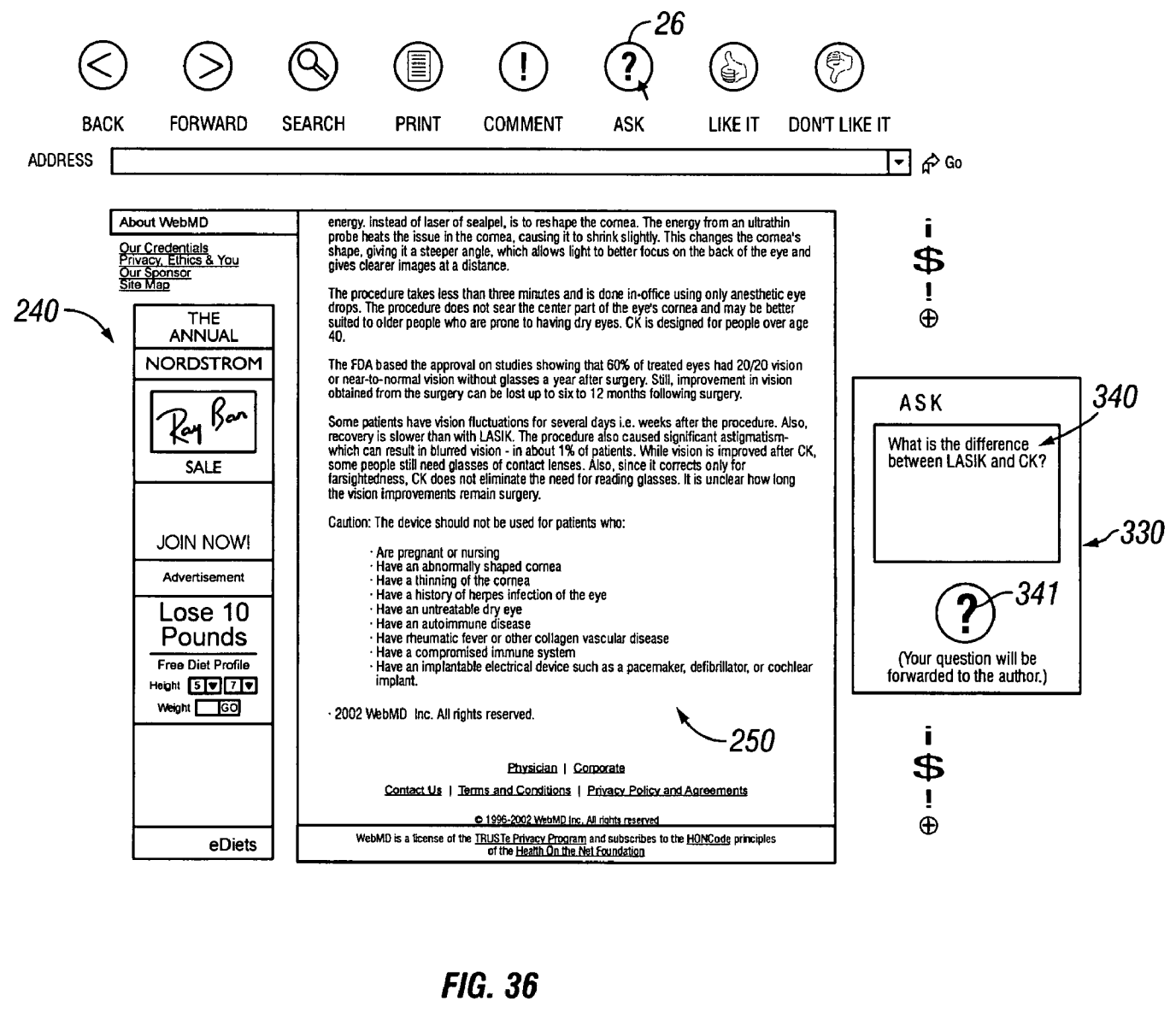

By selecting the ask button 26, the Meta-Web server spawns an ask window 330 into which the user may enter his question (FIG. 36). The user asks his question 340 and submits it to the Meta-Web server by selecting the ask button 341.

Figure 37:
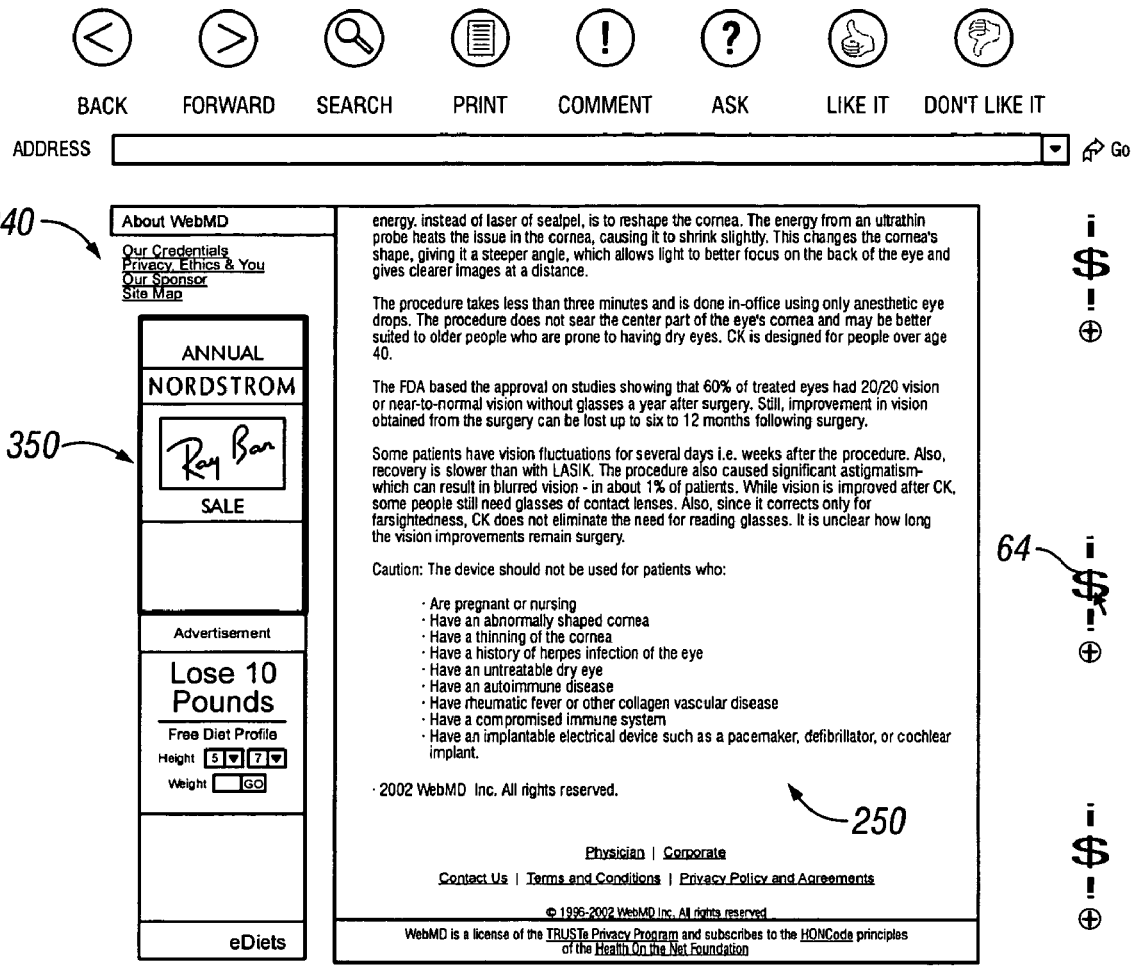
FIG. 37 is a display which shows the user selecting another buy button according to the invention.

As shown in FIG. 37, the user selects the buy button 64 and the Ray-Ban Ad 350 on the left side of the display is highlighted. The user is not interested in sun glasses, so he makes another choice.

Figure 38:
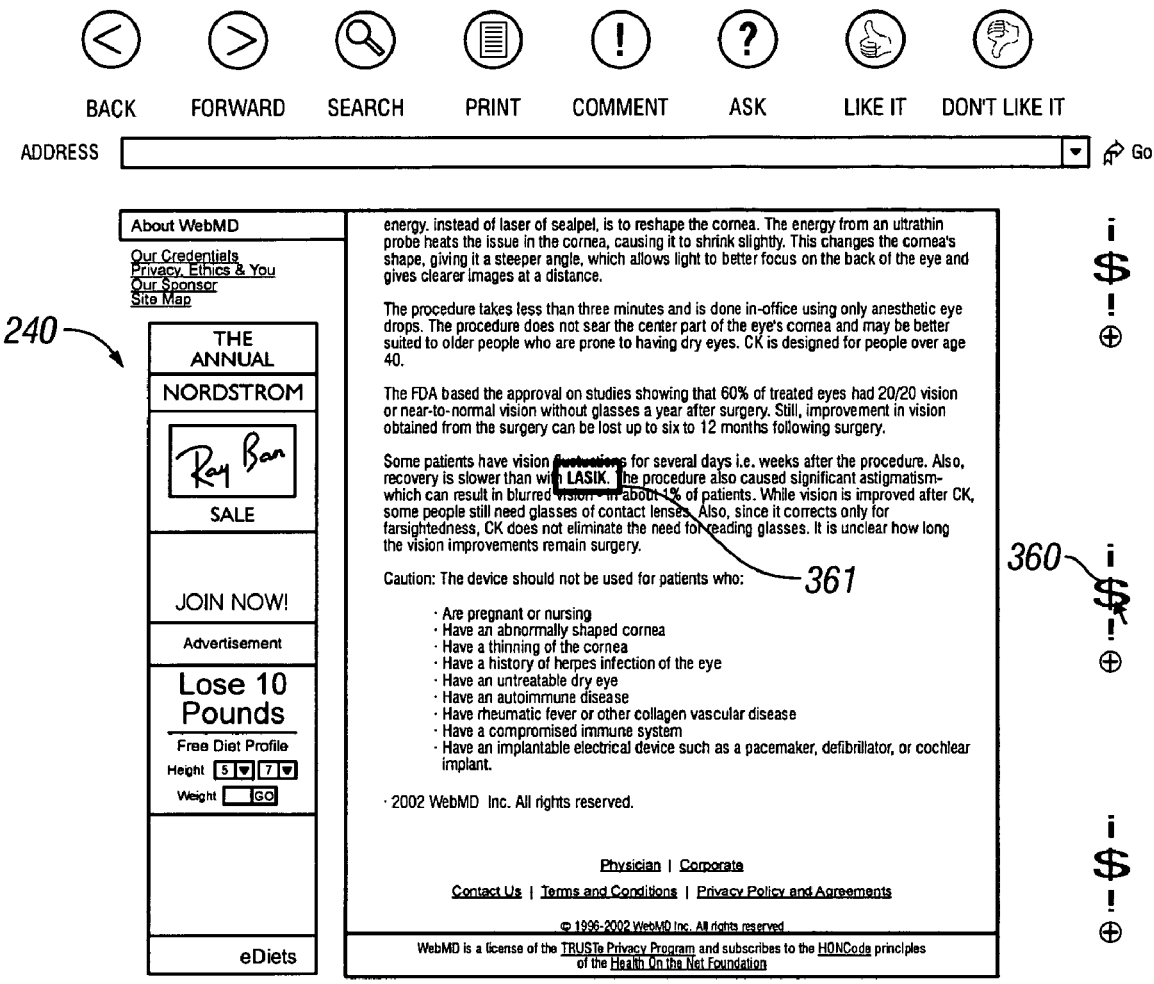
FIG. 38 is a display which shows a list of vendors according to the invention.

As shown in FIG. 38, the user selects another buy button 360 and the word LASIK 361 in the text is highlighted. Because the user is interested in LASIK, rather than Ray-Ban, the user selects the buy button associated with LASIK. Thus, multiple instances of buy buttons and other buttons may be presented to the user on the right hand side to help the user judge the relevancy of the particular portion of the document. The user's choice in selecting LASIK is recorded in the registry by the Meta-Web server and this information may be used in the future to provide more relevant information to the user and/or to groups of users.

As a result of selecting the buy button 360, the user is presented with a list of vendors 370 (FIG. 39). The list of the vendors is a results screen that is sorted in a personalized way. As with other result screens, the relevancy of the results are displayed by various types of icons. In FIG. 39, some icons appear darker while others appear lighter.

As shown in FIG. 40, the user selects the personal interest icon 380. In this example the Meta-Web server has brought together a number of pieces of information to make its recommendation. As shown in the relevancy window 381, the vendor is "Maloney Vision Institute," Dr. Maloney is associated with the vendor, Dr. Maloney is rated highly by Dr. Szabo, and Dr. Szabo is rated highly by the user and his personal physician. Also indicated is that the vendor is covered under the user's medical insurance provider.

Figure 42:
FIG. 42 is a display which shows the vendor's Web site according to the invention.

As shown in FIG. 41, the vendor has an associated Web site 390 and the user selects the Web site. As a result, the vendors Web site 400 is displayed to the user, see FIG. 42.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A Meta-Web apparatus, comprising:
a browser for a user entering a search query and for displaying result pages to said user, the result pages comprising Web pages;
a search engine for receiving said search query and for generating search results in response thereto;
a registry for receiving and storing user annotations and other metadata; a Meta-Web server for creating said result pages dynamically from said search results generated by said search engine by performing a look-up in said registry to determine if there is a user annotation or other metadata associated with said search results and by ordering said search results according to their relevance, said relevance dynamically determined according to said user annotations and other metadata stored in said registry, said Meta-web server subsequently sending said result pages to said browser for viewing by said user entering said query; and
an annotation bar for providing a mechanism to input said user annotations and other metadata to be stored in said registry, said annotation bar dynamically added to any content that is served to a user by said Meta-Web server;
wherein said annotation bar comprises user-actuated buttons which provide functions that allow a user to comment, ask questions related to the search result, indicate that the search result is relevant, and to indicate that the search result is not relevant, all of which is stored in said registry;

wherein each annotation provided by a user and stored in said registry dynamically alters subsequent searches, thereby providing more relevant search results;

wherein said user selects portions of documents which are then used by said Meta-Web server to identify annotations in said registry and dynamically generate information relating thereto;

a related items button for a portion of text that is highlighted by said user that provides related items and information for said highlighted text.

2. The apparatus of claim 1, said result pages comprising:
Web pages that comprise a content page with an annotation tool.

3. The apparatus of claim 1, wherein content displayed to said user is dynamically extracted from said registry by said Meta-Web server.

4. The apparatus of claim 1, wherein said Meta-Web server constructs a search query page which includes a field into which a user can enter one or more search terms.

5. The apparatus of claim 1, further comprising:
a relevance button that is displayed to said user to create a display item which explains the relevance of a term.

6. The apparatus of claim 1, further comprising:
means for said user to select an item to frame said item in a page for purposes of user annotation.

7. The apparatus of claim 6, wherein annotations are linked to a user's search space so that further queries by said user return said annotations.

8. The apparatus of claim 1, wherein one or more items selected by said user lead to a product node, wherein said Meta-Web server performs an independent search to collect data with regard to a particular product, and wherein said Meta-Web server dynamically creates a Web page for said user that comprises information collected in real time.

9. The apparatus of claim 8, wherein said information comprises:
annotations comprising offers by one or more merchants to sell said product and, optionally, other information of interest in connection with said product.

10. The apparatus of claim 1, further comprising:
a filter for said search results based on a user profile, where said user profile comprises any of user performances and user information, wherein said user information comprises any of trusted reputation systems, preferred vendors, and areas of user understanding, interest, or user competency.

11. The apparatus of claim 1, wherein said search results are sorted in a way that is personalized for said user.

12. The apparatus of claim 11, wherein said personalization comprises an endorsement by a personal friend.

13. The apparatus of claim 1, wherein one or more connections are formed by said Meta-Web server based on personal information of said user and other information, all of which reside in said registry or within a realm of resources available to said Meta-Web server.

14. The apparatus of claim 1, further comprising:
a Meta-Web object which represents a product node that is dynamically created by said Meta-Web to group together all information relating to a product.

15. The apparatus of claim 1, further comprising:
a buy button with which a user can enter into a personalized purchase transaction to bring said user to a preferred vendor or list of vendors.

16. The apparatus of claim 1, further comprising:
an action that updates a user's profile in said Meta-Web server and that takes said user back to a results screen;
wherein said Meta-Web server uses said updated user profile to re-write said search results.

17. The apparatus of claim 1, further comprising:
a comment button for allowing said user to add a comment to a document or portion of a document;
wherein said user comment is added to said registry.

18. The apparatus of claim 1, further comprising:
means for asking a question related to a document.

19. The apparatus of claim 15, further comprising:
multiple instances of action buttons that are presented to said user to help the user judge the relevancy of a particular portion of a document.

20. The apparatus of claim 1, wherein said registry establishes connections between said objects therein, said connections comprising typed lines between said registry objects, said links optionally comprising relationships between said objects, said objects optionally comprising representation of any of products, people, places, categories, groups, organizations, roles, documents, portions of documents, certifications, ratings, dates, and times.

* * * * *